United States Patent
Ding et al.

(10) Patent No.: US 11,023,295 B2
(45) Date of Patent: Jun. 1, 2021

(54) UTILIZING A NEURAL NETWORK MODEL TO DETERMINE RISK ASSOCIATED WITH AN APPLICATION PROGRAMMING INTERFACE OF A WEB APPLICATION

(71) Applicant: Accenture Global Solutions Limited, Dublin (IE)

(72) Inventors: Lei Ding, North Potomac, MD (US); Xiaoyong Yuan, Gainesville, FL (US); Malek Ben Salem, Falls Church, VA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/664,130

(22) Filed: Oct. 25, 2019

(65) Prior Publication Data
US 2021/0124628 A1    Apr. 29, 2021

(51) Int. Cl.
| | |
|---|---|
| *G06F 9/54* | (2006.01) |
| *G06N 3/08* | (2006.01) |
| *G06F 16/903* | (2019.01) |
| *G06F 16/955* | (2019.01) |
| *G06F 17/18* | (2006.01) |

(52) U.S. Cl.
CPC ............ *G06F 9/541* (2013.01); *G06F 16/903* (2019.01); *G06F 16/955* (2019.01); *G06N 3/08* (2013.01); *G06F 17/18* (2013.01)

(58) Field of Classification Search
CPC ...... G06F 9/541; G06F 16/903; G06F 16/955; G06F 17/18; G06N 3/08
See application file for complete search history.

(56) References Cited

U.S. PATENT DOCUMENTS

| | | | |
|---|---|---|---|
| 2011/0161991 A1* | 6/2011 | Graham, Jr. .......... | G06F 16/958 719/328 |
| 2015/0350174 A1 | 12/2015 | Reno et al. | |
| 2018/0144815 A1* | 5/2018 | Chapman-Mcquiston | ................. G16H 50/30 |

(Continued)

OTHER PUBLICATIONS

Jacob Devlin et al., "BERT: Pre-training of Deep Bidirectional Transformers for Language Understanding", May 24, 2019, 16 pages.

(Continued)

*Primary Examiner* — Doon Y Chow
*Assistant Examiner* — Kimberly L Jordan
(74) *Attorney, Agent, or Firm* — Harrity & Harrity, LLP

(57) ABSTRACT

A device may extract content, path data, and query data from API requests, and may identify events based on the extracted data. The device may combine a sequence of the events with the events to generate sequence-embedded events, and may train a neural network model with the sequence-embedded events to generate a trained neural network model. The device may receive an API request, may extract new content, new path data, and new query data from the API request, and may identify new events based on the newly extracted data. The device may process the new events, with the trained neural network model, to generate predicted events, and may calculate an anomaly score based on the predicted events. The device may compare the anomaly score with a threshold to determine a risk for the API request, and may cause the API request to be blocked or permitted based on the risk.

20 Claims, 17 Drawing Sheets

(56) References Cited

U.S. PATENT DOCUMENTS

2018/0211010 A1* 7/2018 Malhotra ............... G16H 50/70
2019/0012460 A1* 1/2019 Hartnett ................. G06N 20/00

OTHER PUBLICATIONS

Sepp Hochreiter et al., "Gradient Flow in Recurrent Nets: the Difficulty of Learning Long-Term Dependencies", 2001, 15 pages.
Sepp Hochreiter et al., "Long Short-Term Memory", Nov. 15, 1997, 32 pages.
Nitish Srivastava et al., "Dropout: A Simple Way to Prevent Neural Networks from Overfilling", Jan. 2014, 30 pages.
Wilson L. Taylor, ""Cloze Procedure": A New Tool for Measuring Readability", 1953, 19 pages.
Ashish Vaswani et al., "Attention Is All You Need", Jun. 12, 2017, 20 pages.
Extended European Search Report for Application No. EP20174855.5, dated Sep. 9, 2020, 9 pages.

\* cited by examiner

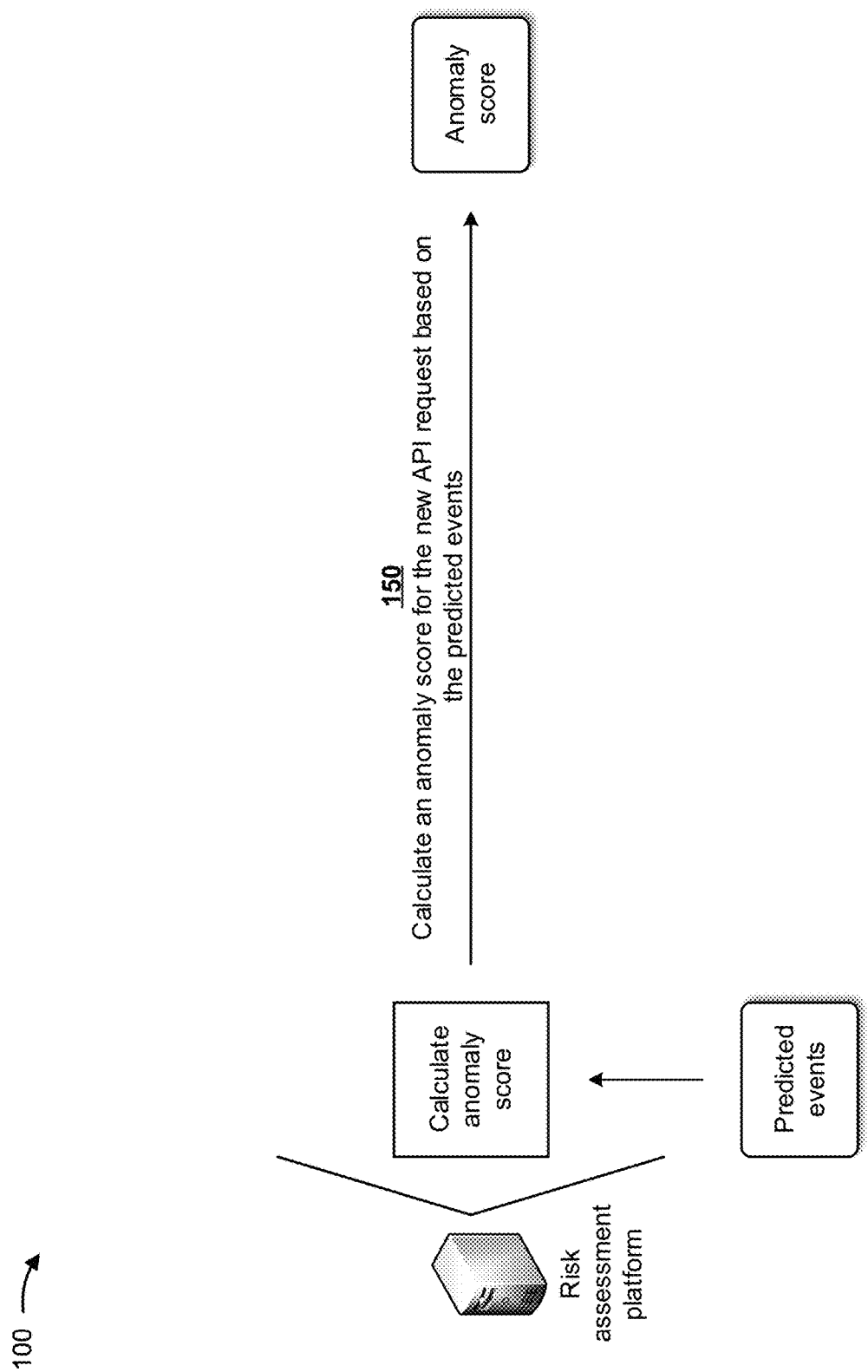

UTILIZING A NEURAL NETWORK MODEL TO DETERMINE RISK ASSOCIATED WITH AN APPLICATION PROGRAMMING INTERFACE OF A WEB APPLICATION

BACKGROUND

A web application programming interface (API) is an API for either a web server or a web browser. An API is a software intermediary that allows applications to communicate with one another. An API provides routines, protocols, and tools for developers building software applications, while enabling the extraction and sharing of data in an accessible manner. Web APIs connect between web applications and other Internet-based services or platforms, such as social networks, games, databases, and/or the like. A web application is a client-server computer program that a client device executes in a web browser. Some web applications include server-side web APIs that receive uniform resource identifiers (URIs) as inputs.

SUMMARY

According to some implementations, a method may include receiving application programming interface requests associated with web applications, and extracting content, path data, and query data from the application programming interface requests. The method may include identifying events associated with the application programming interface requests based on the content, the path data, and the query data, and combining a sequence of the events with the events to generate sequence-embedded events. The method may include training a neural network model with the sequence-embedded events to generate a trained neural network model, and receiving a new application programming interface request associated with a new web application. The method may include extracting new content, new path data, and new query data from the new application programming interface request, and identifying new events associated with the new application programming interface request based on the new content, the new path data, and the new query data. The method may include processing the new events, with the trained neural network model, to generate predicted events, and calculating an anomaly score for the new application programming interface request based on the predicted events. The method may include comparing the anomaly score with a threshold to determine a risk associated with the new application programming interface request, and causing the new application programming interface request to be blocked or permitted based on the risk associated with the new application programming interface request.

According to some implementations, a device may include one or more memories, and one or more processors to receive an application programming interface request associated with a web application, and extract content, path data, and query data from the application programming interface request. The one or more processors may identify events associated with the application programming interface request based on the content, the path data, and the query data, and may process the events, with a neural network model, to generate predicted events. The neural network model may be trained with historical sequence-embedded events that are generated based on historical events associated with historical application programming interface requests. The historical events may be identified based on historical content, historical path data, and historical query data extracted from the historical application programming interface requests. The one or more processors may calculate an anomaly score for the application programming interface request based on the predicted events, and may compare the anomaly score with a threshold to determine a risk associated with the application programming interface request. The one or more processors may cause the application programming interface request to be blocked or permitted based on the risk associated with the application programming interface request.

According to some implementations, a non-transitory computer-readable medium may store one or more instructions that, when executed by one or more processors of a device, may cause the one or more processors to receive application programming interface requests associated with web applications, and extract content, path data, and query data from the application programming interface requests. The one or more instructions may cause the one or more processors to identify events associated with the application programming interface requests based on the content, the path data, and the query data, and combine a sequence of the events with the events to generate sequence-embedded events. The one or more instructions may cause the one or more processors to train a neural network model with the sequence-embedded events to generate a trained neural network model, and receive a new application programming interface request associated with a new web application. The one or more instructions may cause the one or more processors to extract new content, new path data, and new query data from the new application programming interface request, and identify new events associated with the new application programming interface request based on the new content, the new path data, and the new query data. The one or more instructions may cause the one or more processors to process the new events, with the trained neural network model, to generate predicted events, and calculate an anomaly score for the new application programming interface request based on the predicted events. The one or more instructions may cause the one or more processors to compare the anomaly score with a threshold to determine a risk associated with the new application programming interface request, and perform one or more actions based on the risk associated with the new application programming interface request.

BRIEF DESCRIPTION OF THE DRAWINGS

FIGS. 1A-1L are diagrams of one or more example implementations described herein.

DETAILED DESCRIPTION

Figure 1A:
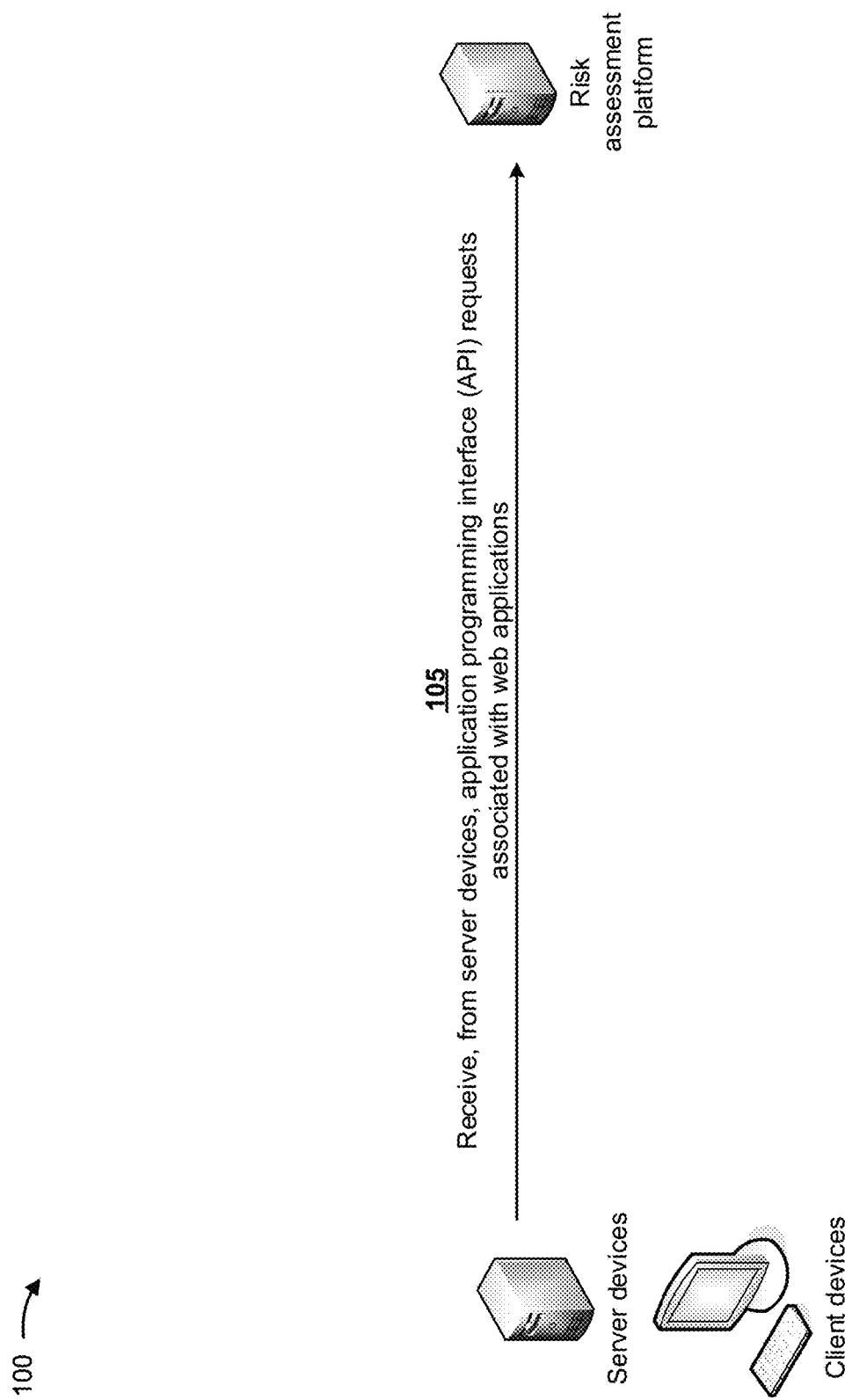

The following detailed description of example implementations refers to the accompanying drawings. The same reference numbers in different drawings may identify the same or similar elements.

APIs often self-document information, such as implementation and internal structure information, which can be used as intelligence for a cyber-attack. Additional vulnerabilities, such as weak authentication, lack of encryption, business logic flaws, insecure endpoints, and/or the like make APIs vulnerable to attacks, such as a man-in-the-middle attack, an API injection attack, a distributed denial-of-service (DDoS) attack, and/or the like. Thus, APIs may waste computing resources (e.g., processing resources, memory resources, communication resources, and/or the like), networking resources, and/or the like associated with detecting cyber-attacks caused by APIs, responding to the cyber-attacks, recovering data lost due to the cyber-attacks, paying for liabilities incurred due to the cyber-attacks, and/or like.

Some implementations described herein provide a risk assessment platform that utilizes a neural network model to determine risk associated with an API of a web application. For example, the risk assessment platform may receive application programming interface requests associated with web applications, and may extract content, path data, and query data from the application programming interface requests. The risk assessment platform may identify events associated with the application programming interface requests based on the content, the path data, and the query data, and may combine a sequence of the events with the events to generate sequence-embedded events. The risk assessment platform may train a neural network model with the sequence-embedded events to generate a trained neural network model, and may receive a new application programming interface request associated with a new web application. The risk assessment platform may extract new content, new path data, and new query data from the new application programming interface request, and may identify new events associated with the new application programming interface request based on the new content, the new path data, and the new query data. The risk assessment platform may process the new events, with the trained neural network model, to generate predicted events, and may calculate an anomaly score for the new application programming interface request based on the predicted events. The risk assessment platform may compare the anomaly score with a threshold to determine a risk associated with the new application programming interface request, and may cause the new application programming interface request to be blocked or permitted based on the risk associated with the new application programming interface request.

In this way, the risk assessment platform automatically determines risk associated with APIs of web applications based on a neural network model, which prevents cyber-attacks caused by APIs and/or reduces times associated with detecting and responding to the cyber-attacks caused by APIs. This, in turn, conserves computing resources, networking resources, and/or the like that would otherwise be wasted in detecting cyber-attacks caused by APIs, responding to the cyber-attacks, recovering data lost due to the cyber-attacks, paying for liabilities incurred due to the cyber-attacks, and/or like.

FIGS. 1A-1L are diagrams of one or more example implementations 100 described herein. As shown in FIG. 1A, one or more client devices may be associated with one or more server devices and a risk assessment platform. In some implementations, the client devices may execute web applications, and the server devices may serve the client devices with respect to the web applications. The risk assessment platform may include a platform that determines risk associated with the APIs of the web applications based on a neural network model, as described herein.

As further shown in FIG. 1A, and by reference number 105, the risk assessment platform may receive, from the server devices, application programming interface (API) requests associated with web applications. In some implementations, the risk assessment platform may receive sequences of API requests associated with the web applications. Each sequence of API requests may be ordered based on times of receipt of the API requests in the sequence. In some implementations, the API requests may include hypertext transfer protocol (HTTP) requests. An HTTP request may include a request line that includes a method (e.g., a method to be performed on a resource identified by an identifier, such as a URI), an identifier (e.g., a URI that identifies the resource upon which the method is to be performed), an HTTP version, and/or the like; request headers (e.g., providing additional information, such as a source address, a destination address, and/or the like); and/or the like.

Figure 1B:
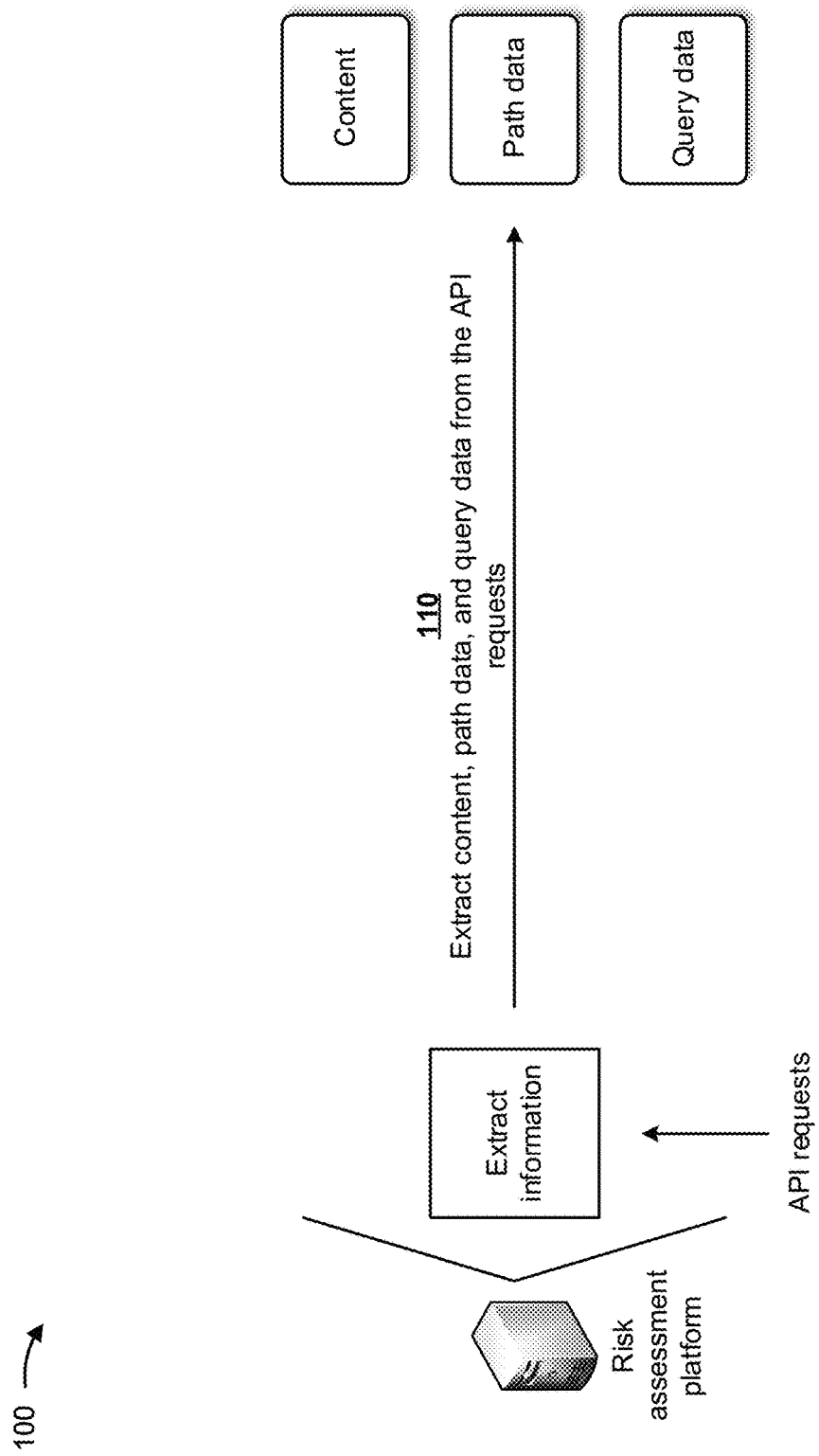

As shown in FIG. 1B, and by reference number 110, the risk assessment platform may extract content, path data, and query data from the API requests. In some implementations, the content may include methods (e.g., HTTP methods) included in the API requests. An HTTP method may include a GET request (e.g., a request used to retrieve information from a server based on a URI), a HEAD request (e.g., a request similar to a GET request, but that transfers a status line and a header section), a POST request (e.g., a request used to send data to a server, such as customer information, a file to be uploaded, and/or the like using hypertext markup language (HTML) forms), a PUT request (e.g., a request that replaces all current representations of a target resource with uploaded content), a DELETE request (e.g., a request that removes all current representations of a target resource given by a URI), a CONNECT request (e.g., a request that establishes a tunnel to a server identified by a URI), an OPTIONS request (e.g., a request that describes communication options for a target resource), a TRACE request (e.g., a request that performs a message loop back test and provides a path to the target resource), and/or the like.

In some implementations, the path data may include URI paths included in the API requests. As described above, an HTTP request may include a URI that identifies a resource upon which to apply the HTTP request. The URI may include data identifying a scheme, an authority, a path, a query, a fragment, and/or the like. The URI path may identify a specific resource to be accessed by a client device. When extracting the path data, the risk assessment platform may identify random paths to achieve path uniformity. For example, the risk assessment platform may process the API requests, with a two-character Markov chain model, to detect random elements in URI paths. The risk assessment platform may segment the URI paths into elements based on special characters (e.g., "/" and "-"), and may investigate every character in each element from left to right. If a probability of an upcoming character, based on two previous characters, is lower than a threshold probability, the risk assessment platform may designate the element as a random element.

In some implementations, the query data may include URI queries. A URI query may include a query string of non-hierarchical data that, along with data in the path data, serves to identify a resource within a scope of a URI scheme and naming authority. The query string may include, for example, a sequence of attribute-value pairs separated by a delimiter.

Figure 1C:
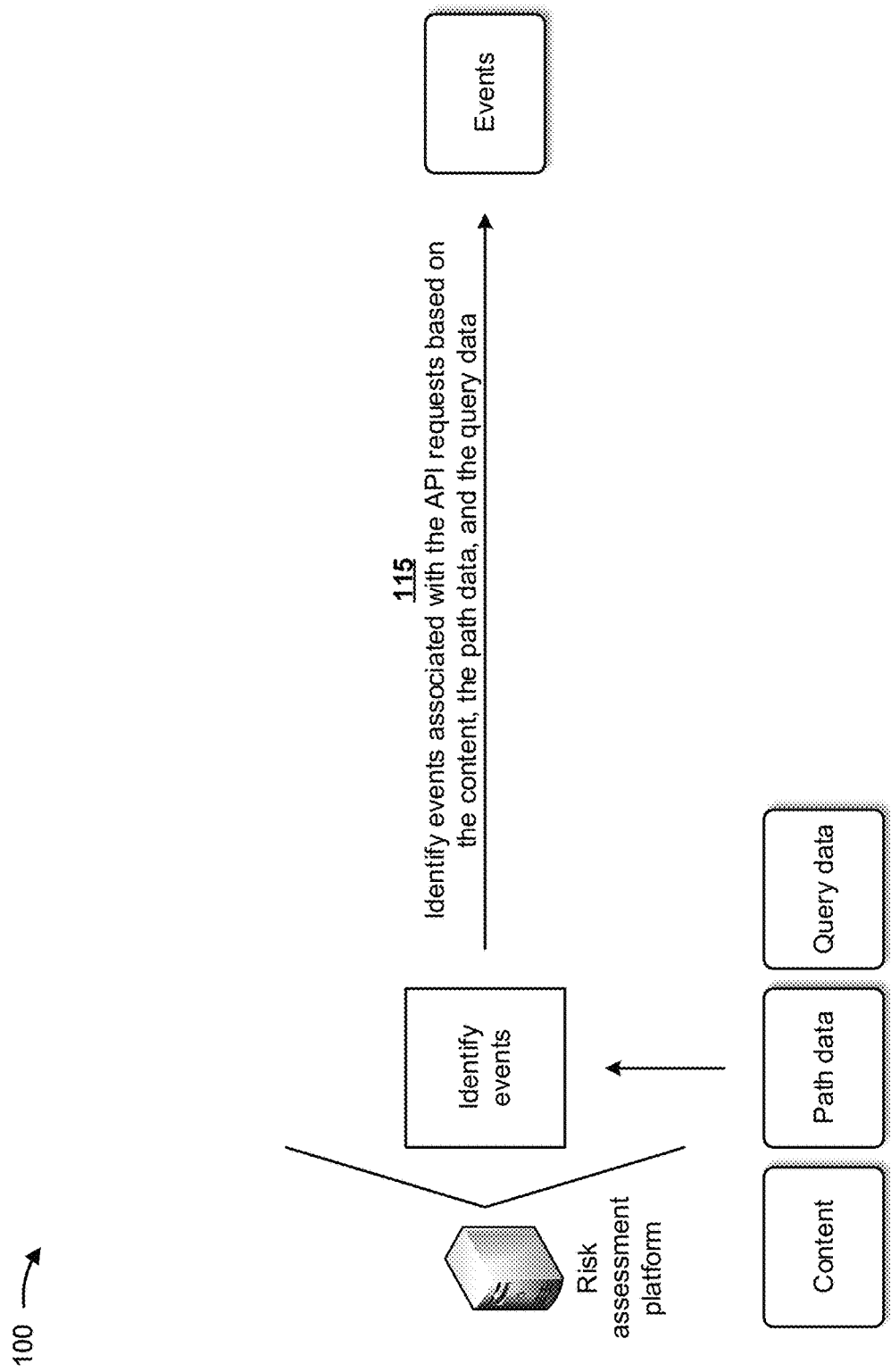

As shown in FIG. 1C, and by reference number 115, the risk assessment platform may identify events associated with the API requests based on the content, the path data, and the query data. In this way, the risk assessment platform may extract information (e.g., the content, the path data, and the query data) from the API requests and may convert the information into semantic events that characterize the API requests. When identifying the events associated with the API requests, the risk assessment platform may identify rare events. For example, the risk assessment platform may determine that an event occurring less than a predetermined quantity of time (e.g., less than two times, three times, and/or the like) is a rare event. In this way, the risk assessment platform may identify rare events during model training.

In some implementations, the risk assessment platform may determine whether an event, of the events, satisfies a predetermined threshold, and may identify the event as a rare event when the event satisfies the predetermined threshold. For example, the risk assessment platform may determine that an event is a rare event if the event occurs less than a threshold quantity of times (e.g., less than two times).

Figure 1D:
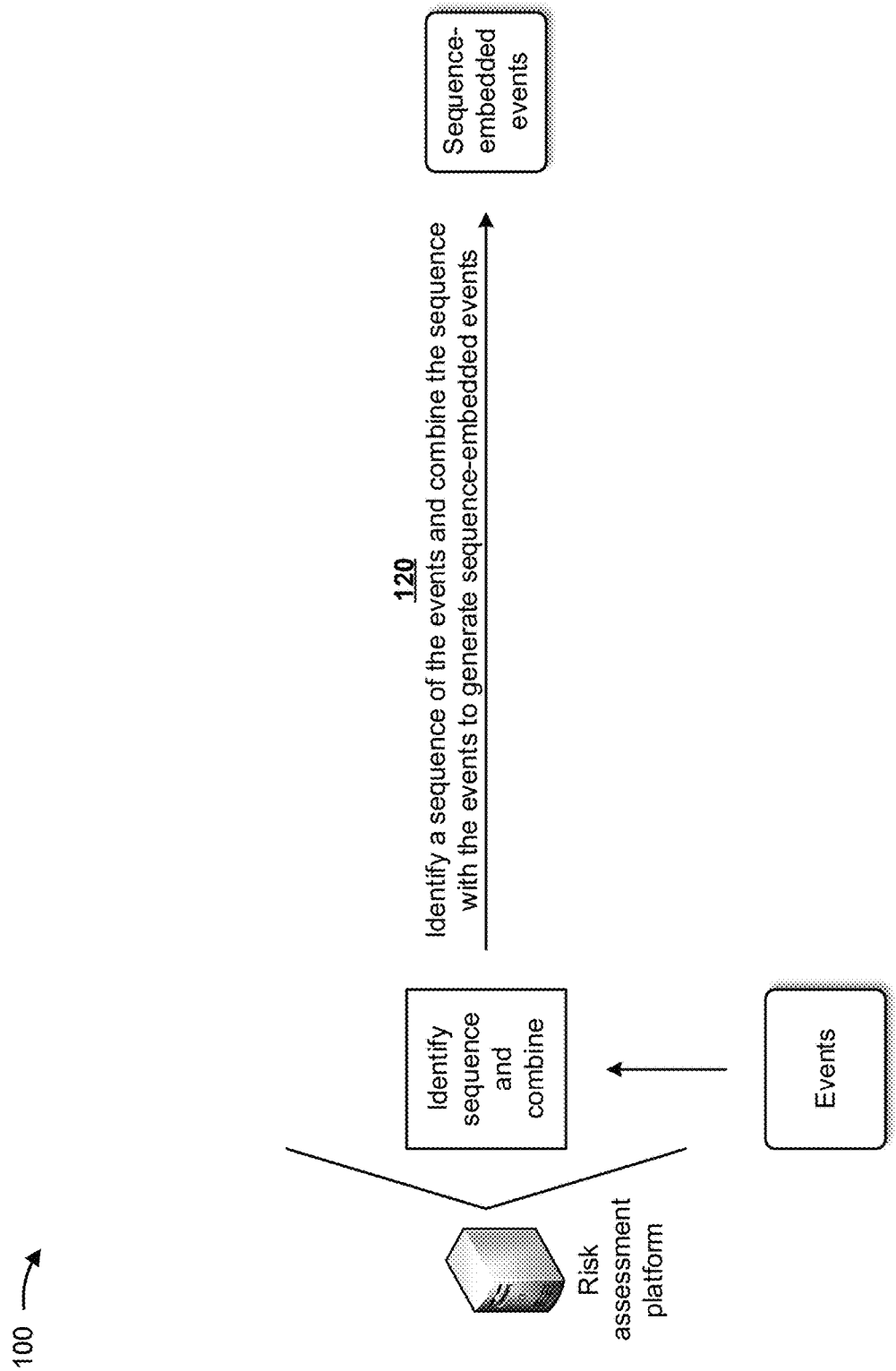

As shown in FIG. 1D, and by reference number 120, the risk assessment platform may identify a sequence of the events and may combine the sequence with the events to generate sequence-embedded events. For example, the risk assessment platform may encode each event into an event embedding (e.g., representing content of each event) and a sequence embedding (e.g., representing an order of each event in the sequence of API requests). In some implementations, the risk assessment platform may extract a semantic representation of the events and may generate an event embedding in a manner similar to the manner in which a word embedding is used to represent meanings of tokens in natural language processing techniques. In some implementations, the risk assessment platform may utilize sequence embedding to add sequential information to a model (e.g., a self-attention neural network model, as described below) that does not contain sequential information of events.

Figure 1E:
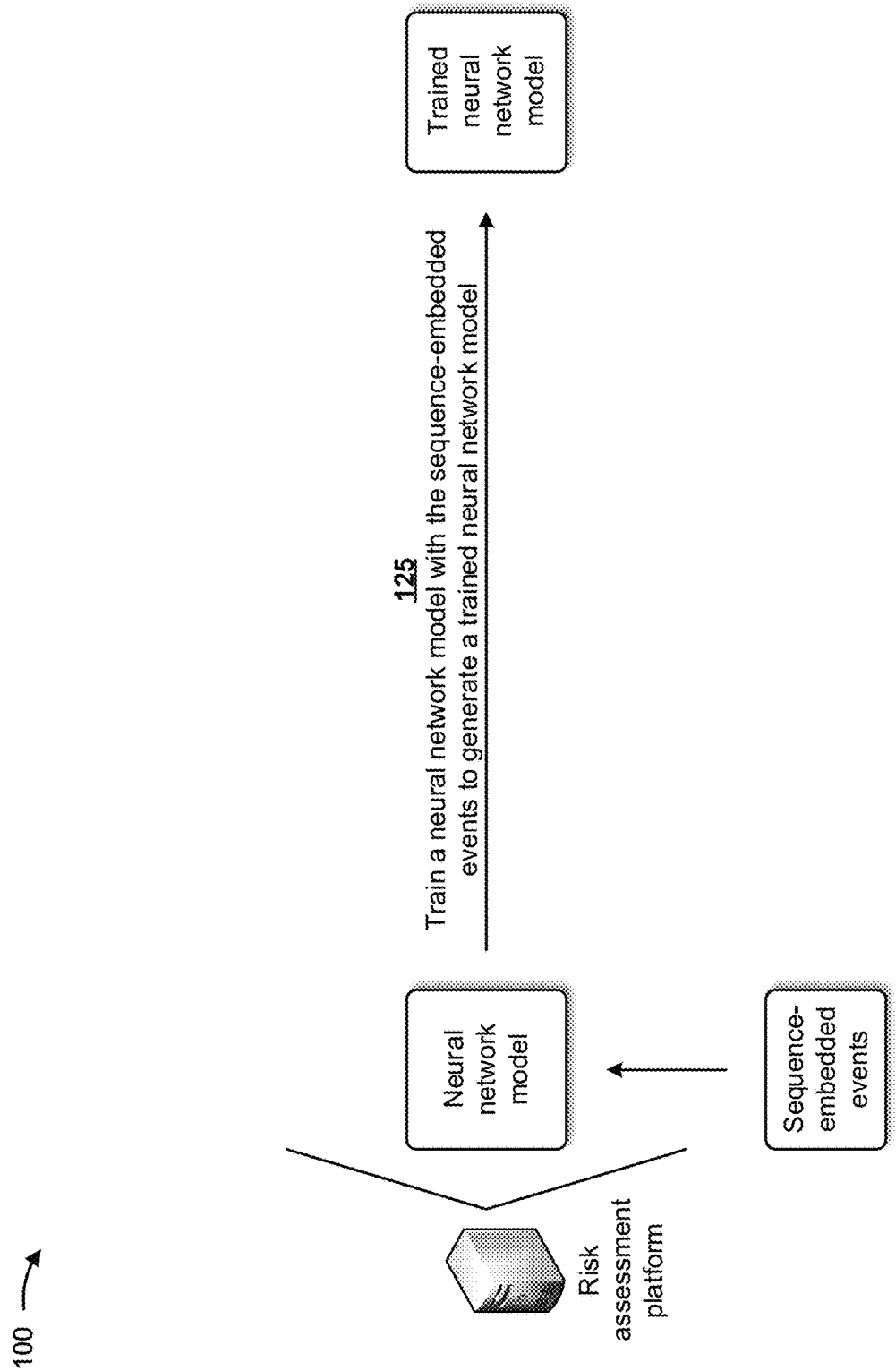

As shown in FIG. 1E, and by reference number 125, the risk assessment platform may train a neural network model with the sequence-embedded events to generate a trained neural network model. In some implementations, the neural network model may include a recurrent neural network (RNN) model, a long short-term memory (LSTM) model, a self-attention neural network model, a combination of one or more of the RNN model, the LSTM model, or the self-attention neural network model, and/or the like.

In some implementations, the neural network model may include an input layer, an embedding layer (e.g., including the event embedding and the sequence embedding, as described above), a self-attention encoding layer, and an output layer. The embedding layer may map an event and a position of the event in a sequence into two sequences and, after generating embeddings of events and positions of the events, may add the two sequences as an embedded sequence. For example, the risk assessment platform may map the event and the position of the event in the sequence into 128-dimension vectors (e.g., $\{EE_1, EE_2, \ldots, EE_n\}$ and $\{SE_1, SE_2, \ldots, SE_n\}$, where n=128). After generating embeddings of events and positions of the events, the risk assessment platform may add the vectors to generate an embedded sequence (e.g., $\{em_1, em_2, \ldots, em_n\}$), and may provide the embedded sequence to encoding layers of the self-attention neural network model.

In some implementations, the self-attention neural network model may include a scaled dot-product attention neural network defined as follows:

$$\text{Attention}(Q, K, V) = \text{Softmax}\left(\frac{QK^T}{\sqrt{d_k}}\right)V$$

where Q, K, and V correspond to a query, a key, and a value, respectively, of a dimension $d_k$. In this case, Q, K, and V may originate from a same sequence of embedded events, which enables the model to focus on the specific events in the sequence and to capture dependencies between events in the sequence. In some implementations, the self-attention neural network model may use a transformer model, which may include a multi-head attention neural network (e.g., which may stack multiple self-attention neural networks), a layer normalization layer, and a Softmax function.

In some implementations, the risk assessment platform may separate the sequence-embedded events into a training set, a validation set, a test set, and/or the like. The training set may be utilized to train the neural network model. The validation set may be utilized to validate results of the trained neural network model. The test set may be utilized to test operation of the trained neural network model.

In some implementations, the risk assessment platform may train the neural network model using, for example, an unsupervised training procedure and based on the sequence-embedded events. For example, the risk assessment platform may perform dimensionality reduction to reduce the sequence-embedded events to a minimum feature set, thereby reducing resources (e.g., processing resources, memory resources, and/or the like) to train the neural network, and may apply a classification technique to the minimum feature set.

In some implementations, the risk assessment platform may use a logistic regression classification technique to determine a categorical outcome (e.g., predicted events). Additionally, or alternatively, the risk assessment platform may use a naïve Bayesian classifier technique. In this case, the risk assessment platform may perform binary recursive partitioning to split the sequence-embedded events into partitions and/or branches, and use the partitions and/or branches to determine outcomes (e.g., predicted events). Based on using recursive partitioning, the risk assessment platform may reduce utilization of computing resources relative to manual, linear sorting and analysis of data points, thereby enabling use of thousands, millions, or billions of data points to train the neural network model, which may result in more accurate models than using fewer data points.

Additionally, or alternatively, the risk assessment platform may use a support vector machine (SVM) classifier technique to generate a non-linear boundary between data points in the training set. In this case, the non-linear boundary is used to classify test data into a particular class.

Additionally, or alternatively, the risk assessment platform may train the neural network model using a supervised training procedure that includes receiving input to the neural network model from a subject matter expert, which may reduce an amount of time, an amount of processing resources, and/or the like to train the neural network model relative to an unsupervised training procedure.

In some implementations, the risk assessment platform may use one or more other model training techniques, such as a latent semantic indexing technique, and/or the like. For example, the risk assessment platform may perform an artificial neural network processing technique (e.g., using a two-layer feedforward neural network architecture, a three-layer feedforward neural network architecture, and/or the like) to perform pattern recognition with regard to patterns of the sequence-embedded events. In this case, using the artificial neural network processing technique may improve an accuracy of the trained neural network model generated by the risk assessment platform by making the model more robust to noisy, imprecise, or incomplete data, and by enabling the risk assessment platform to detect patterns and/or trends undetectable to human analysts or systems using less complex techniques.

In some implementations, rather than training the neural network model, the risk assessment platform may obtain the trained neural network model from another system or device that trained the neural network model to generate the trained neural network model. In this case, the risk assessment platform may provide the other system or device with the sequence-embedded events for use in training the neural network model, and may provide the other system or device with updated sequence-embedded events to retrain the neural network model in order to update the trained neural network model.

In some implementations, prior to training the neural network model, the risk assessment platform may pretrain the neural network model to predict arbitrary events in the sequence of the events. For example, the risk assessment platform may randomly mask a portion of the events in the sequence of the events, and may utilize the neural network model to attempt to predict the portion of the events that are randomly masked. As a specific example, the risk assessment platform may randomly mask a percentage (e.g., 25%) of events in an input sequence and may employ the neural network model to predict the randomly-masked events. In practice, the masked events may be replaced with a mask event in the input sequence, and the neural network model may be pretrained to predict the masked events.

Figure 1F:
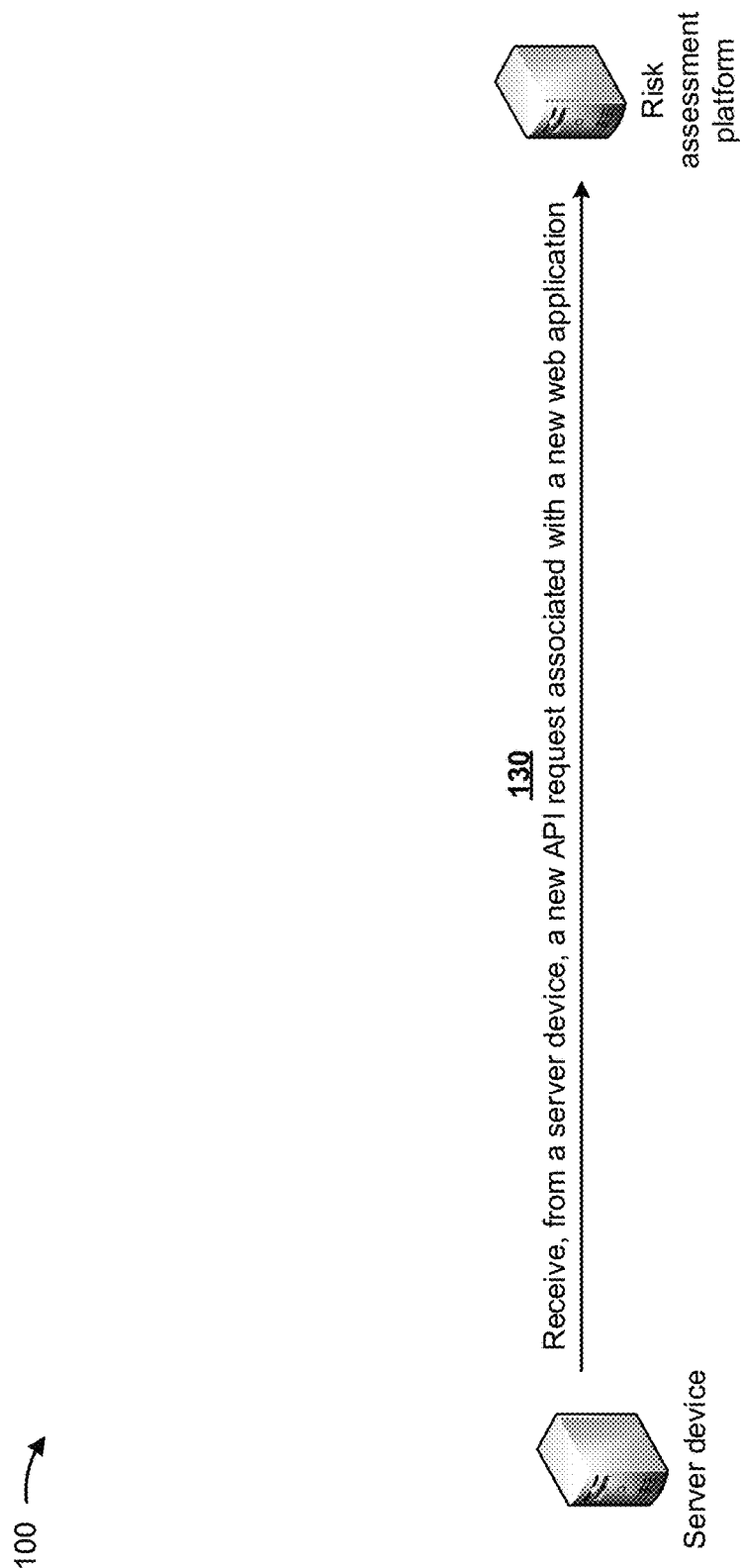

As shown in FIG. 1F, and by reference number 130, the risk assessment platform may receive, from a server device, a new API request associated with a new web application. In some implementations, the new API request may include an HTTP request that includes a request line (e.g., identifying a method to be performed on a resource identified by a URI, the URI that identifies the resource upon which to perform the method, and an HTTP version identifier), request headers, and/or the like, as described above.

Figure 1G:
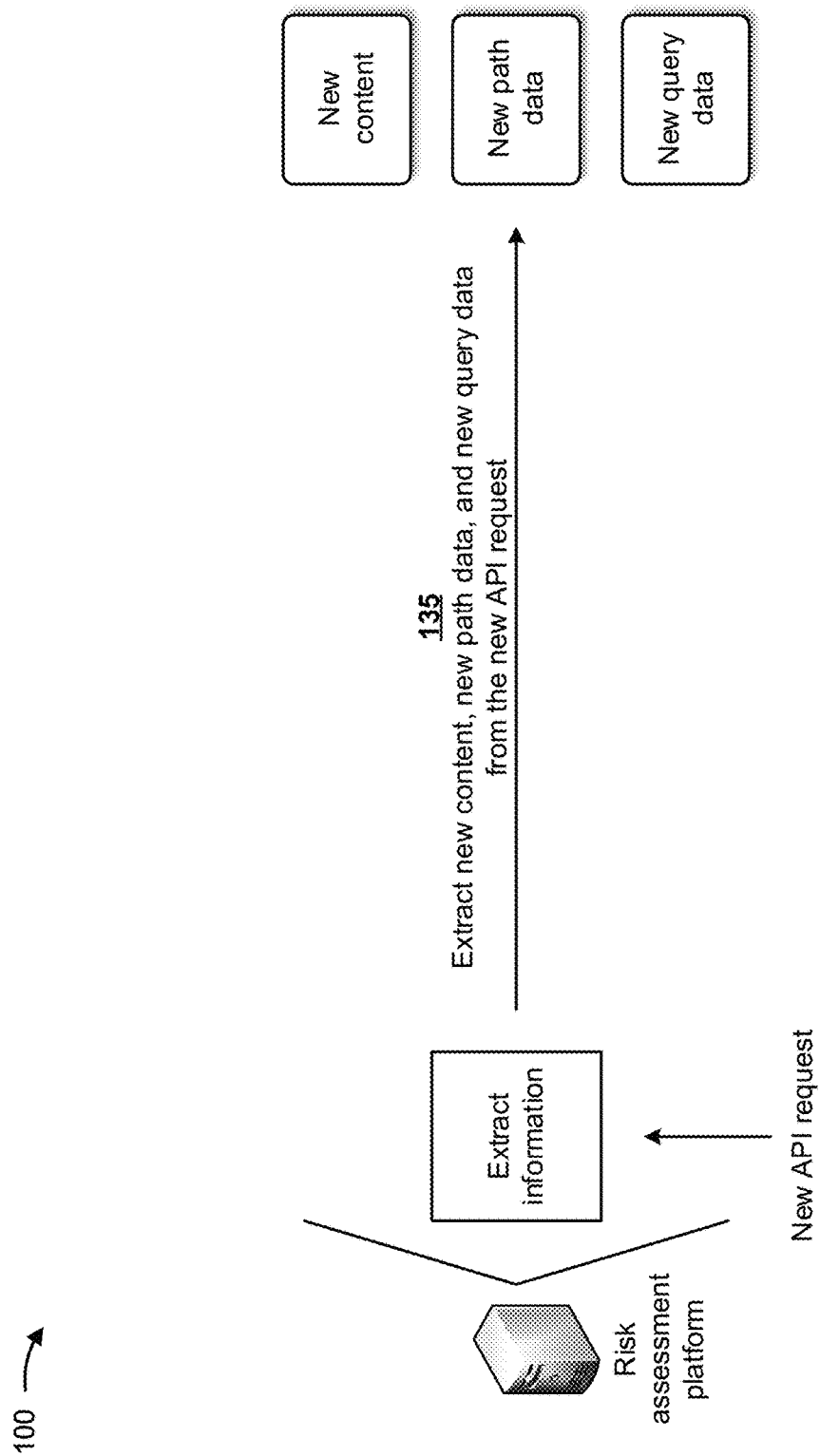

As shown in FIG. 1G, and by reference number 135, the risk assessment platform may extract new content, new path data, and new query data from the new API request. The new content may include an HTTP method (e.g., a GET request, a POST request, an UPDATE request, and/or the like, as described above). The new path data may include a URI path (e.g., identifying a specific resource to access, as described above). The new query data may include a URI query (e.g., a query string of non-hierarchical data, as described above).

Figure 1H:
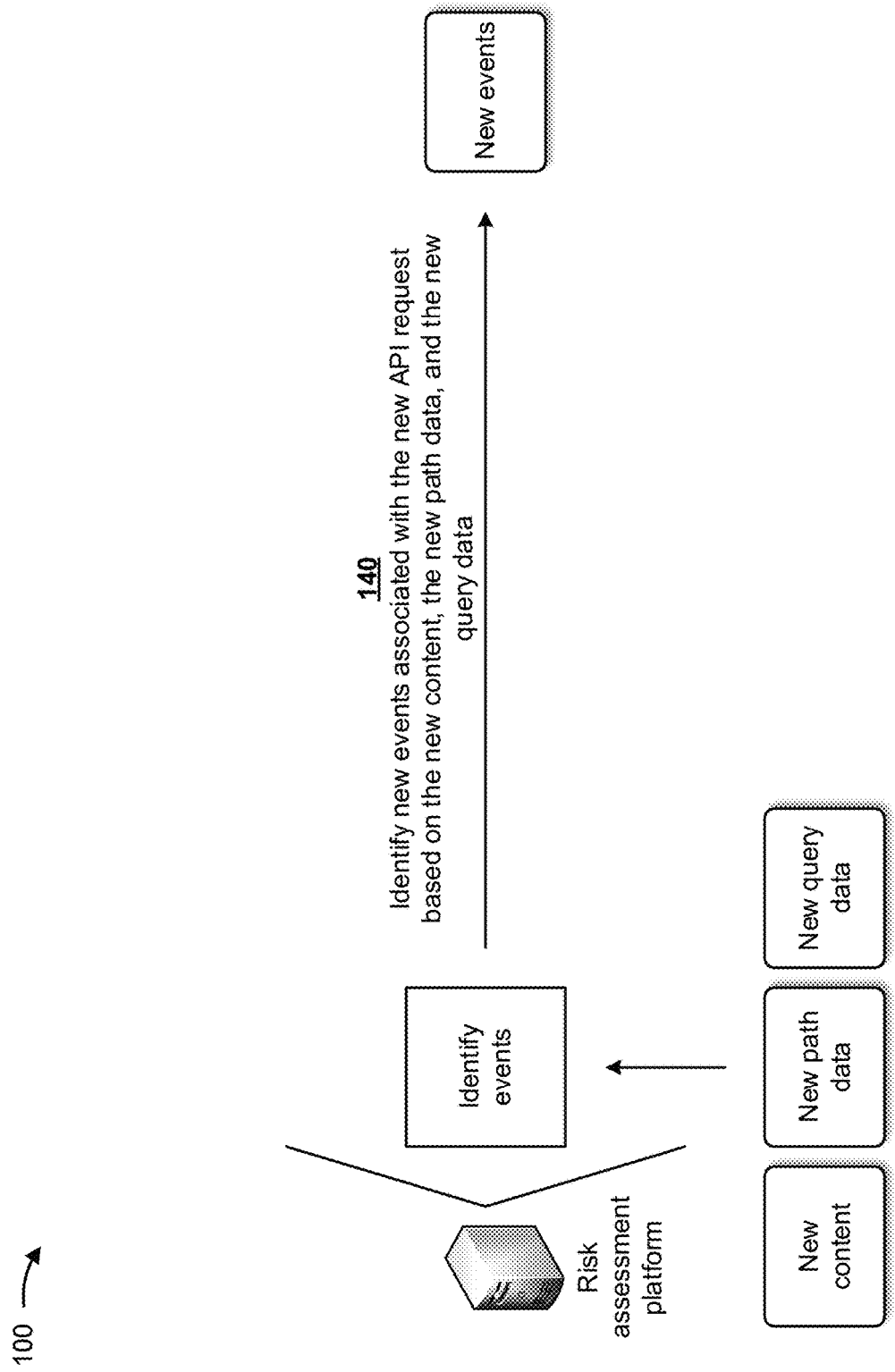

As shown in FIG. 1H, and by reference number 140, the risk assessment platform may identify new events associated with the new API request based on the new content, the new path data, and the new query data in a manner similar to the manner described above in connection with FIG. 1C. In this way, the risk assessment platform may extract information (e.g., the new content, the new path data, and the new query data) from the new API request and may convert the information into new semantic events that characterize the new API request.

Figure 1I:
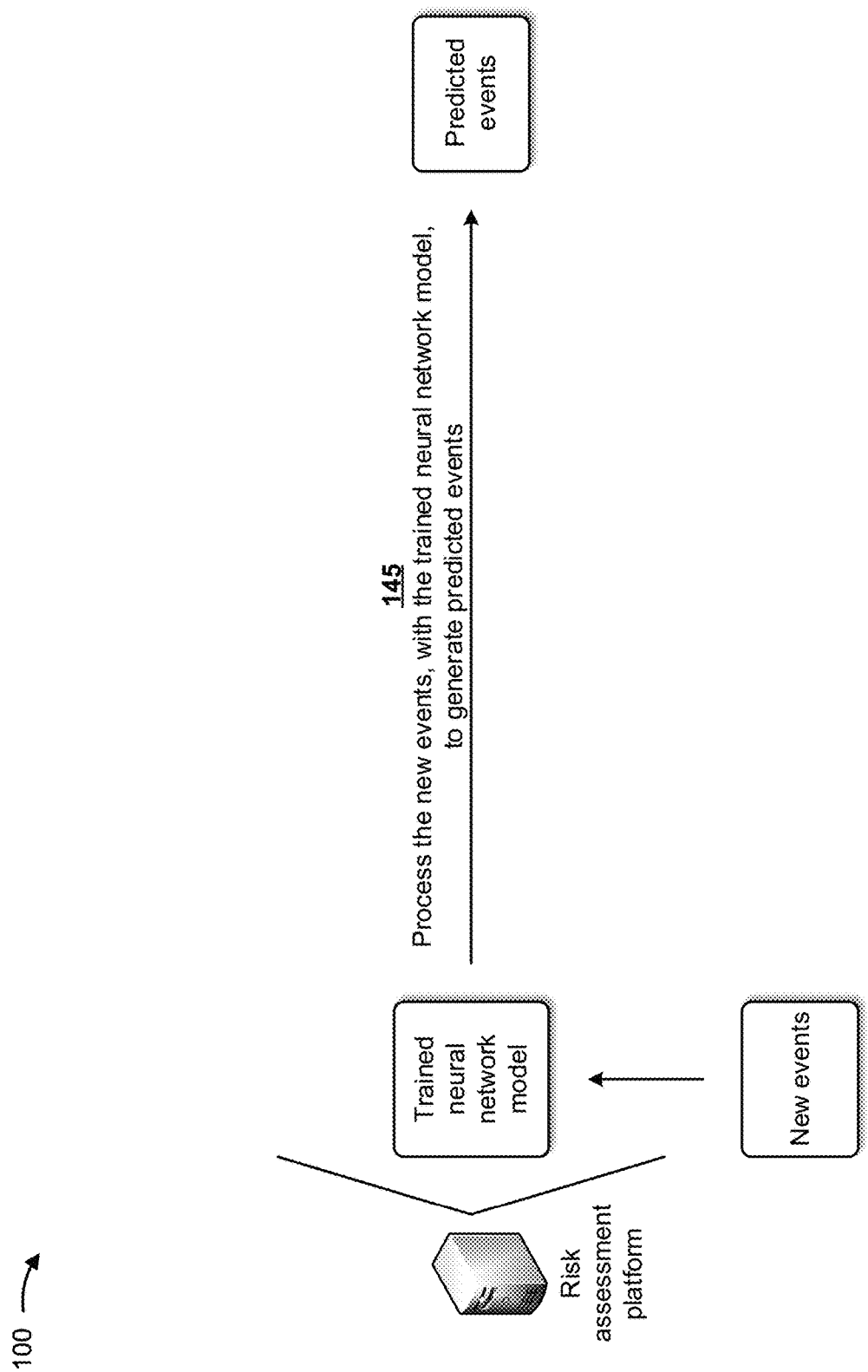

As shown in FIG. 1I, and by reference number 145, the risk assessment platform may process the new events, with the trained neural network model, to generate predicted events. In some implementations, the predicted events may include an event indicating a method predicted to be executed by the new API request, an event indicating a URI of a resource predicted to be accessed by the new API request, an event indicating a URI query predicted to be executed by the new API request, and/or the like.

As shown in FIG. 1J, and by reference number 150, the risk assessment platform may calculate an anomaly score for the new API request based on the predicted events. The anomaly score may provide an indication of a confidence level associated with classifying the new API request as an anomaly. In some implementations, when calculating the anomaly score, the risk assessment platform may determine probabilities associated with the predicted events, may determine a probability associated with the new API request, and may calculate the anomaly score for the new API request based on the probabilities associated with the predicted events and the probability associated with the API request. For example, the anomaly score (s) may be calculated as follows:

$$s = 1 - \frac{1}{\tau + 1}$$

where τ may correspond to a probability of the new API request, and s may be in the range of zero to one. In this case, a higher anomaly score may indicate a higher confidence level associated with classifying the event as an anomaly.

Figure 1K:
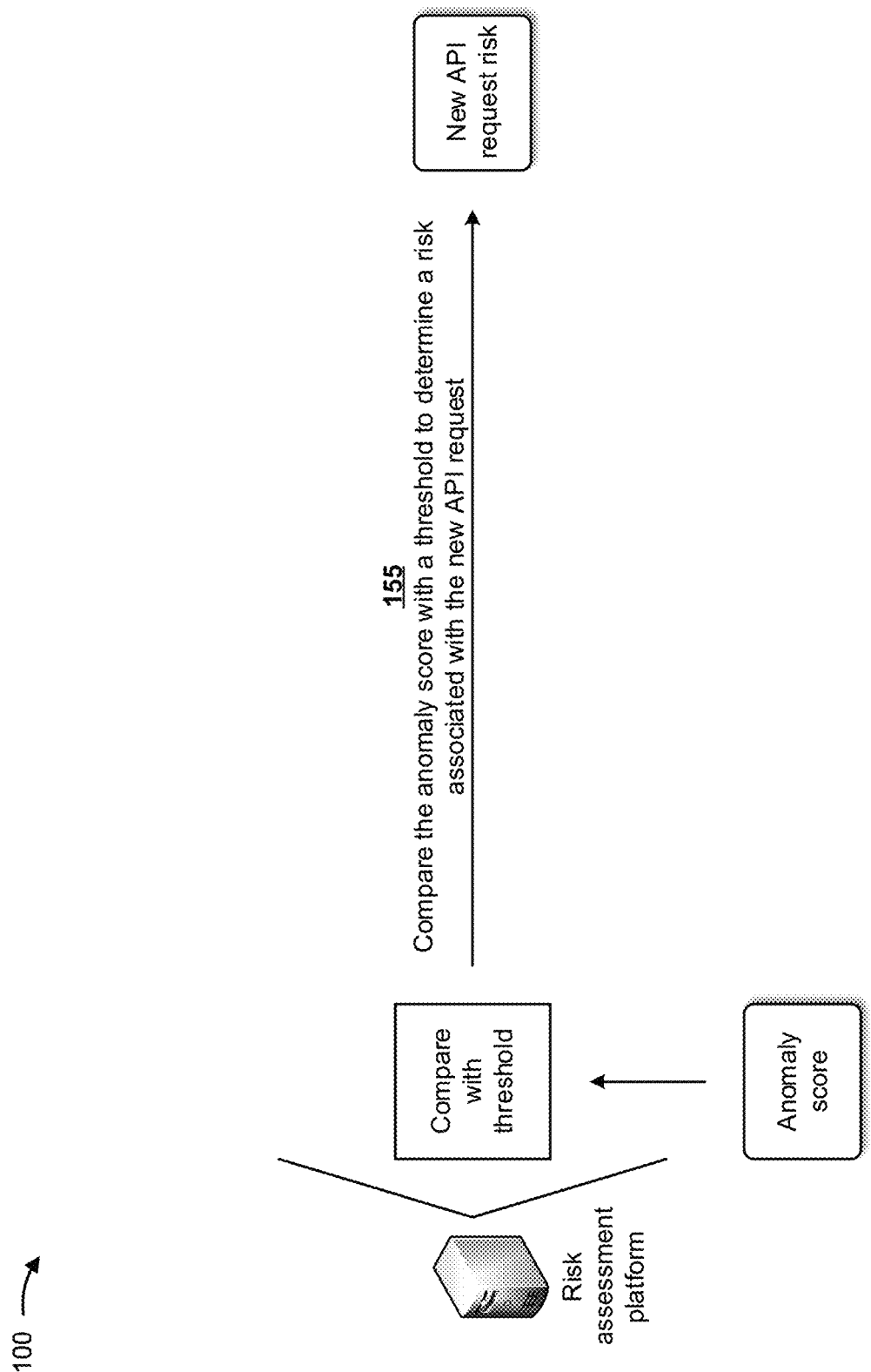

As shown in FIG. 1K, and by reference number 155, the risk assessment platform may compare the anomaly score with a threshold to determine a risk associated with the new API request. In some implementations, the risk assessment platform may determine the new API request to be associated with a greater risk if the anomaly score satisfies the threshold. Alternatively, the risk assessment platform may determine the new API request to be associated with a lesser risk if the anomaly score fails to satisfy the threshold.

Figure 1L:
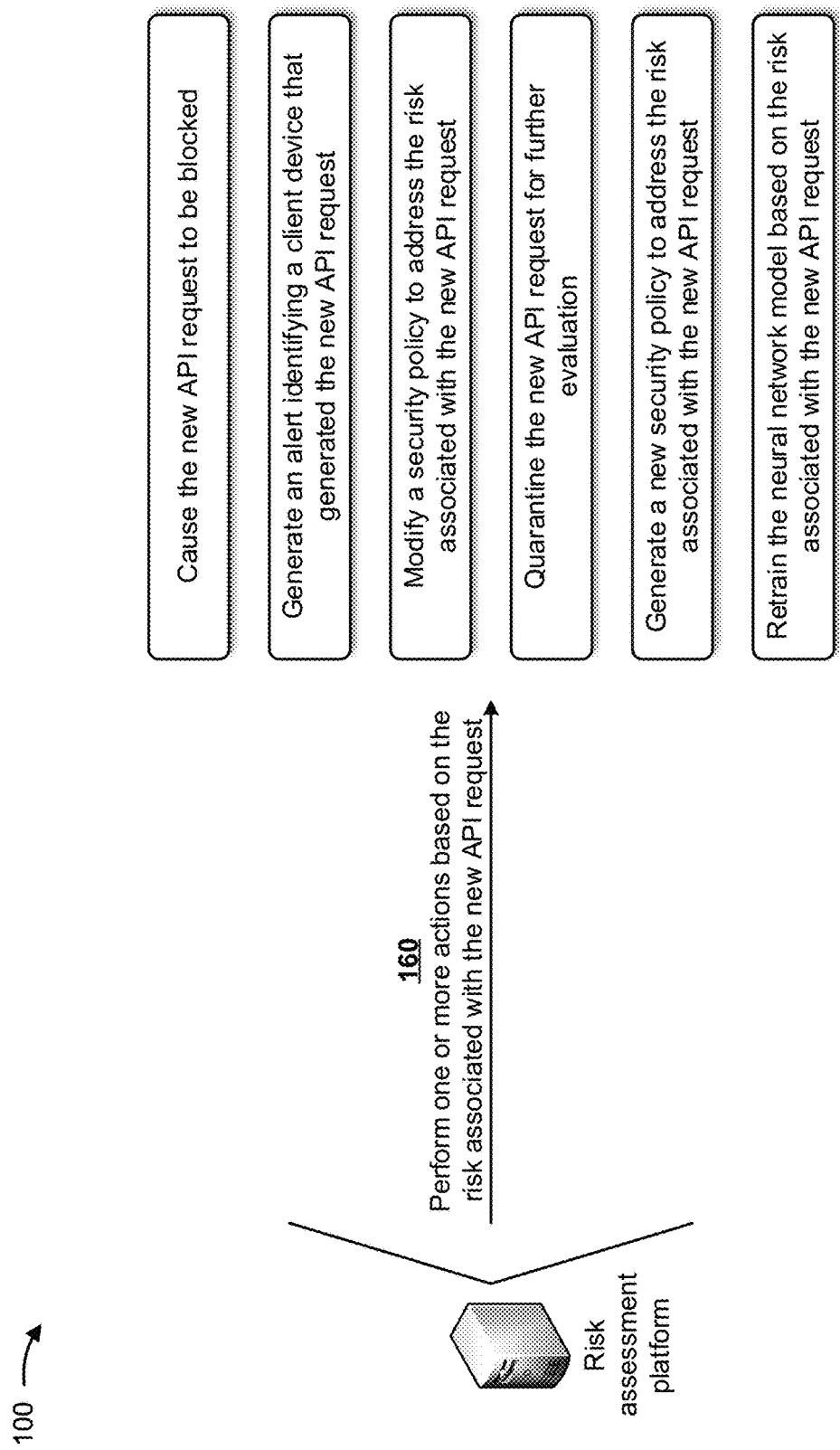

As shown in FIG. 1L, and by reference number 160, the risk assessment platform may perform one or more actions based on the risk associated with the new API request. In some implementations, the one or more actions may include the risk assessment platform causing the new API request to be blocked. In this way, the risk assessment platform may protect the servers from cyber-attacks (e.g., man-in-the-middle attacks, API injection attacks, DDoS attacks, and/or the like), thereby conserving computing resources (e.g., processing resources, memory resources, communication resources, and/or the like), networking resources, and/or the like that would otherwise be expended with detecting cyber-attacks caused by APIs, responding to the cyber-attacks, recovering data lost due to the cyber-attacks, paying for liabilities incurred due to the cyber-attacks, and/or like.

In some implementations, the one or more actions may include the risk assessment platform generating an alert identifying a client device that generated the new API request. In this way, the risk assessment platform may enable a server to assess whether the client device is likely to be associated with a risk of a cyber-attack, thereby conserving resources that would otherwise be wasted with detecting, responding to, recovering from, or paying for losses caused by a cyber-attack.

In some implementations, the one or more actions may include the risk assessment platform modifying a security policy to address the risk associated with the new API request. In this way, the risk assessment platform may proactively identify types of API requests that are likely to be associated with cyber-attacks, and may take preemptive actions (e.g., modify security measures, security software, and/or the like) to address the potential risks associated with the types of API requests, thereby conserving resources that would otherwise be wasted with detecting, responding to, recovering from, or paying for losses caused by a cyber-attack.

In some implementations, the one or more actions may include the risk assessment platform quarantining the new API request for further evaluation. In this way, the risk assessment platform may prevent immediate harm that could result from a cyber-attack due to the new API, while thereafter allowing the new API request to be permitted in the event of determining that such a cyber-attack is unlikely. Thus, the risk assessment platform may protect against cyber-attacks, and may conserve resources that would otherwise be wasted with detecting, responding to, recovering from, or paying for losses caused by such cyber-attacks.

In some implementations, the one or more actions may include the risk assessment platform generating a new security policy to address the risk associated with the new API request. In this way, the risk assessment platform may identify types of API requests that are likely to be associated with cyber-attacks, and may take future actions (e.g., generate new security measures, software, and/or the like) to address the potential risks associated with the types of API requests identified, thereby conserving resources that would otherwise be wasted with detecting, responding to, recovering from, or paying for losses caused by a cyber-attack.

In some implementations, the one or more actions may include the risk assessment platform retraining the neural network model based on the risk associated with the new API request. In this way, the risk assessment platform may improve the accuracy of the neural network model in processing events based on API requests and generating predicted events based on which anomaly scores can be calculated, which may improve speed and efficiency of the neural network model and conserve computing resources, networking resources, and/or the like.

In some implementations, the one or more actions may include the risk assessment platform permitting the new API request based on the risk associated with the new API request. In this way, the risk assessment platform may enable web applications to be utilized when risks associated with APIs are low, thereby conserving resources that would otherwise be wasted as a result of loss of services performed by the web applications.

In this way, a neural network model is utilized to determine risk associated with an API of a web application. This, in turn, conserves computing resources (e.g., processing resources, memory resources, communication resources, and/or the like), networking resources, and/or the like that would otherwise be wasted in detecting cyber-attacks caused by APIs, responding to the cyber-attacks, recovering data lost due to the cyber-attacks, paying for liabilities incurred due to the cyber-attacks, and/or like. Furthermore, several different stages of the process for determining risk associated with an API of a web application may be automated via a neural network model, which may improve speed and efficiency of the process and conserve computing resources, networking resources, and/or the like. Implementations described herein use a rigorous, computerized process to perform tasks or roles that were not previously performed. For example, currently there does not exist a technique that utilizes a neural network model to determine risk associated with an API of a web application.

As indicated above, FIGS. 1A-1L are provided merely as examples. Other examples may differ from what is described with regard to FIGS. 1A-1L.

Figure 2:
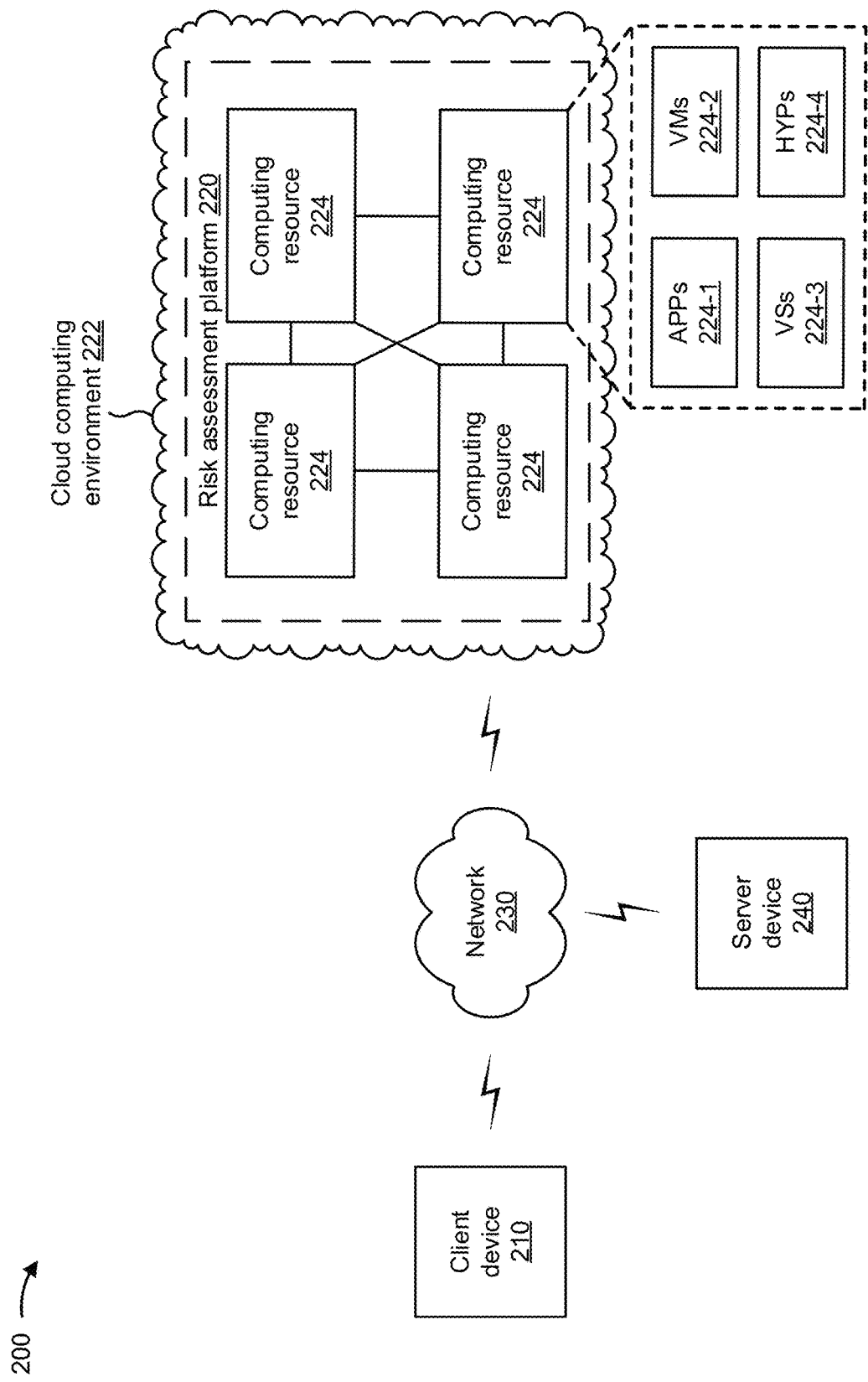
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a risk assessment platform 220, a network 230, and a data structure 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to risk assessment platform 220 and/or data structure 240.

Risk assessment platform 220 includes one or more devices that utilize a neural network model to determine risk associated with an application programming interface of a web application. In some implementations, risk assessment platform 220 may be designed to be modular such that certain software components may be swapped in or out depending on a particular need. As such, risk assessment platform 220 may be easily and/or quickly reconfigured for different uses. In some implementations, risk assessment platform 220 may receive information from and/or transmit information to one or more client devices 210 and/or data structures 240.

In some implementations, as shown, risk assessment platform 220 may be hosted in a cloud computing environment 222. Notably, while implementations described herein describe risk assessment platform 220 as being hosted in cloud computing environment 222, in some implementations, risk assessment platform 220 may not be cloud-based (i.e., may be implemented outside of a cloud computing environment) or may be partially cloud-based.

Cloud computing environment 222 includes an environment that hosts risk assessment platform 220. Cloud computing environment 222 may provide computation, software, data access, storage, etc., services that do not require end-user knowledge of a physical location and configuration of system(s) and/or device(s) that hosts risk assessment platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host risk assessment platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210 and/or data structure 240. Application 224-1 may eliminate a need to install and execute the software applications on client device 210. For example, application 224-1 may include software associated with risk assessment platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of risk assessment platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device. In some implementations, server device 240 may receive information from and/or transmit information to client device 210 and/or risk assessment platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
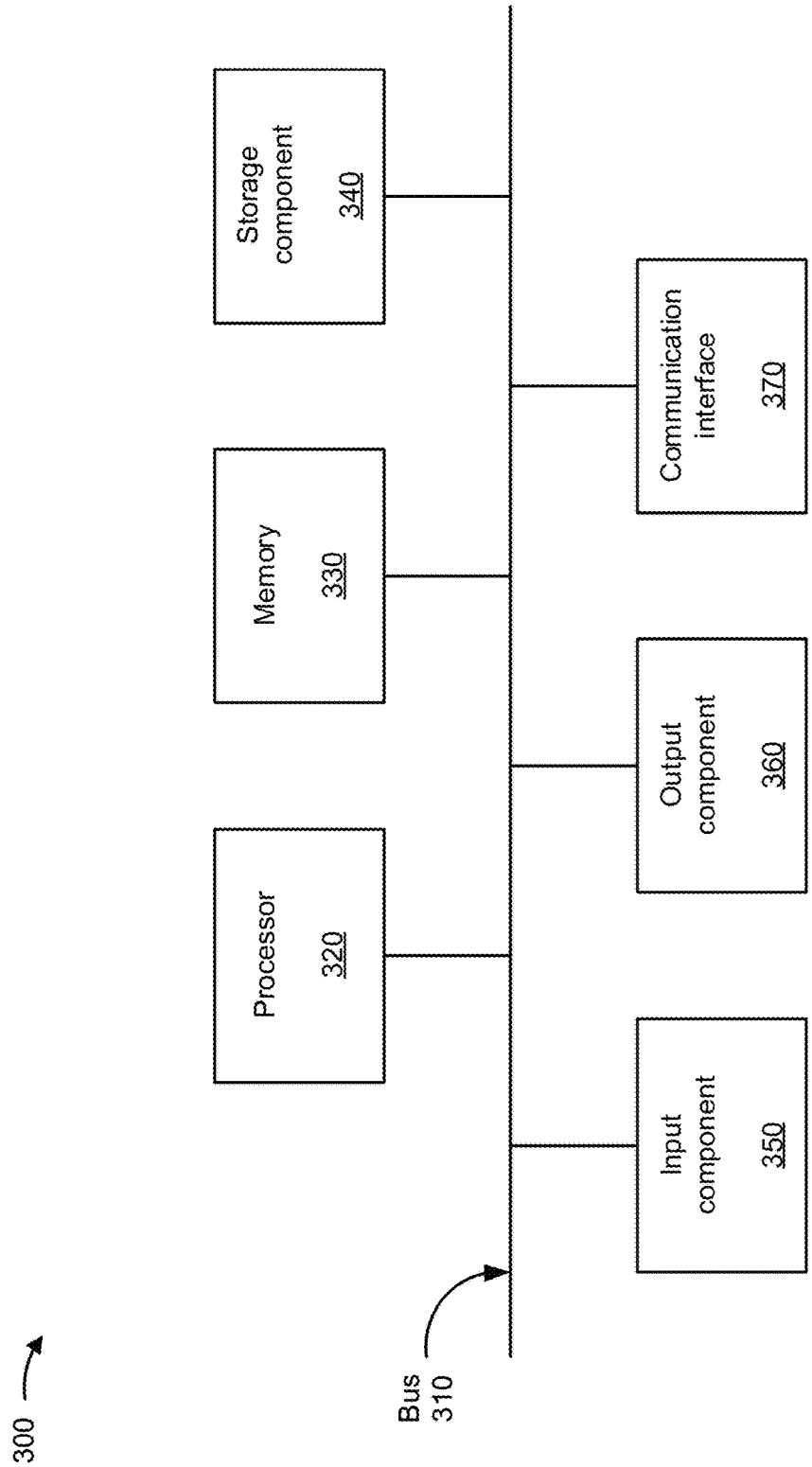
FIG. 3 is a diagram of example components of one or more devices of FIG. 2.

FIG. 3 is a diagram of example components of a device 300. Device 300 may correspond to client device 210, risk assessment platform 220, and/or computing resource 224. In some implementations, client device 210, risk assessment platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
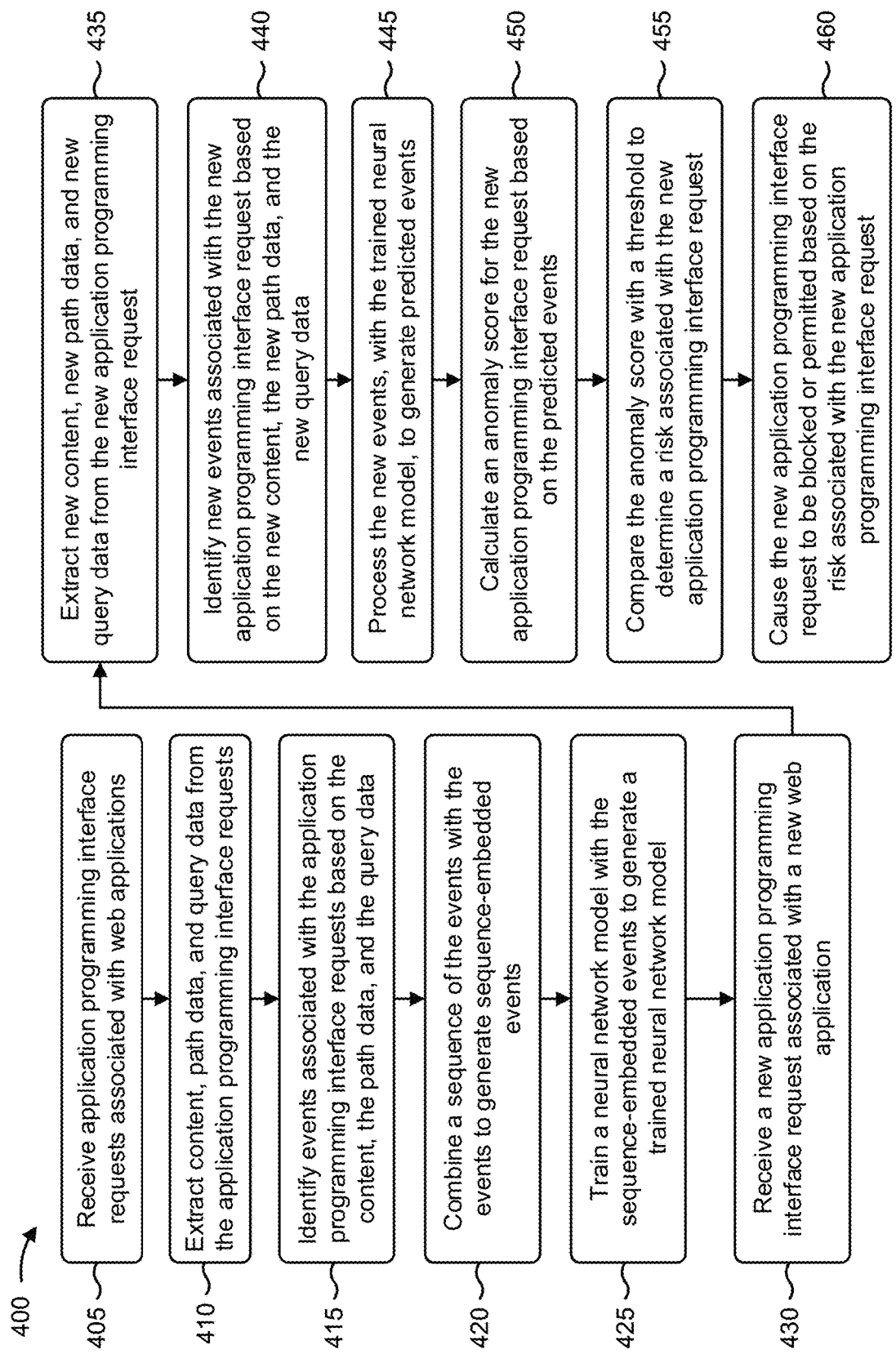
FIGS. 4-6 are flow charts of example processes for utilizing a neural network model to determine risk associated with an application programming interface of a web application.

FIG. 4 is a flow chart of an example process 400 for utilizing a neural network model to determine risk associated with an application programming interface of a web application. In some implementations, one or more process blocks of FIG. 4 may be performed by a device (e.g., risk assessment platform 220). In some implementations, one or more process blocks of FIG. 4 may be performed by another device or a group of devices separate from or including the device, such as a client device (e.g., client device 210), a server device (e.g., server device 240), and/or the like.

As shown in FIG. 4, process 400 may include receiving application programming interface requests associated with web applications (block 405). For example, the device (e.g., using computing resource 224, processor 320, communication interface 370, and/or the like) may receive application programming interface requests associated with web applications, as described above.

As further shown in FIG. 4, process 400 may include extracting content, path data, and query data from the application programming interface requests (block 410). For example, the device (e.g., using computing resource 224, processor 320, memory 330, and/or the like) may extract content, path data, and query data from the application programming interface requests, as described above.

As further shown in FIG. 4, process 400 may include identifying events associated with the application programming interface requests based on the content, the path data, and the query data (block 415). For example, the device (e.g., using computing resource 224, processor 320, storage component 340, and/or the like) may identify events associated with the application programming interface requests based on the content, the path data, and the query data, as described above.

As further shown in FIG. 4, process 400 may include combining a sequence of the events with the events to generate sequence-embedded events (block 420). For example, the device (e.g., using computing resource 224, processor 320, memory 330, and/or the like) may combine a sequence of the events with the events to generate sequence-embedded events, as described above.

As further shown in FIG. 4, process 400 may include training a neural network model with the sequence-embedded events to generate a trained neural network model (block 425). For example, the device (e.g., using computing resource 224, processor 320, memory 330, storage component 340, and/or the like) may train a neural network model with the sequence-embedded events to generate a trained neural network model, as described above.

As further shown in FIG. 4, process 400 may include receiving a new application programming interface request associated with a new web application (block 430). For example, the device (e.g., using computing resource 224, processor 320, communication interface 370, and/or the like) may receive a new application programming interface request associated with a new web application, as described above.

As further shown in FIG. 4, process 400 may include extracting new content, new path data, and new query data from the new application programming interface request (block 435). For example, the device (e.g., using computing resource 224, processor 320, storage component 340, and/or the like) may extract new content, new path data, and new query data from the new application programming interface request, as described above.

As further shown in FIG. 4, process 400 may include identifying new events associated with the new application programming interface request based on the new content, the new path data, and the new query data (block 440). For example, the device (e.g., using computing resource 224, processor 320, memory 330, and/or the like) may identify new events associated with the new application programming interface request based on the new content, the new path data, and the new query data, as described above.

As further shown in FIG. 4, process 400 may include processing the new events, with the trained neural network model, to generate predicted events (block 445). For example, the device (e.g., using computing resource 224, processor 320, storage component 340, and/or the like) may process the new events, with the trained neural network model, to generate predicted events, as described above.

As further shown in FIG. 4, process 400 may include calculating an anomaly score for the new application programming interface request based on the predicted events (block 450). For example, the device (e.g., using computing resource 224, processor 320, memory 330, and/or the like) may calculate an anomaly score for the new application programming interface request based on the predicted events, as described above.

As further shown in FIG. 4, process 400 may include comparing the anomaly score with a threshold to determine a risk associated with the new application programming interface request (block 455). For example, the device (e.g., using computing resource 224, processor 320, storage component 340, and/or the like) may compare the anomaly score with a threshold to determine a risk associated with the new application programming interface request, as described above.

As further shown in FIG. 4, process 400 may include causing the new application programming interface request to be blocked or permitted based on the risk associated with the new application programming interface request (block 460). For example, the device (e.g., using computing resource 224, processor 320, memory 330, storage component 340, communication interface 370, and/or the like) may cause the new application programming interface request to be blocked or permitted based on the risk associated with the new application programming interface request, as described above.

Process 400 may include additional implementations, such as any single implementation or any combination of implementations described below and/or in connection with one or more other processes described elsewhere herein.

In a first implementation, process 400 may include pretraining, prior to training the neural network model, the neural network model to predict arbitrary events in the sequence of the events.

In a second implementation, alone or in combination with the first implementation, pretraining the neural network model may include randomly masking a portion of the events in the sequence of the events, and utilizing the neural network model to attempt to predict the portion of the events that are randomly masked.

In a third implementation, alone or in combination with one or more of the first and second implementations, process 400 may include generating a security policy to address the risk associated with the new application programming interface request.

In a fourth implementation, alone or in combination with one or more of the first through third implementations, process 400 may include quarantining, based on the risk associated with the new application programming interface request, the new application programming interface request for further evaluation.

In a fifth implementation, alone or in combination with one or more of the first through fourth implementations, process 400 may include retraining the neural network model based on the risk associated with the new application programming interface request.

In a sixth implementation, alone or in combination with one or more of the first through fifth implementations, the neural network model may include one or more of a recurrent neural network (RNN) model, a long short-term memory (LSTM) model, a self-attention neural network model, or a combination of one or more of the RNN model, the LSTM model, or the self-attention neural network model.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
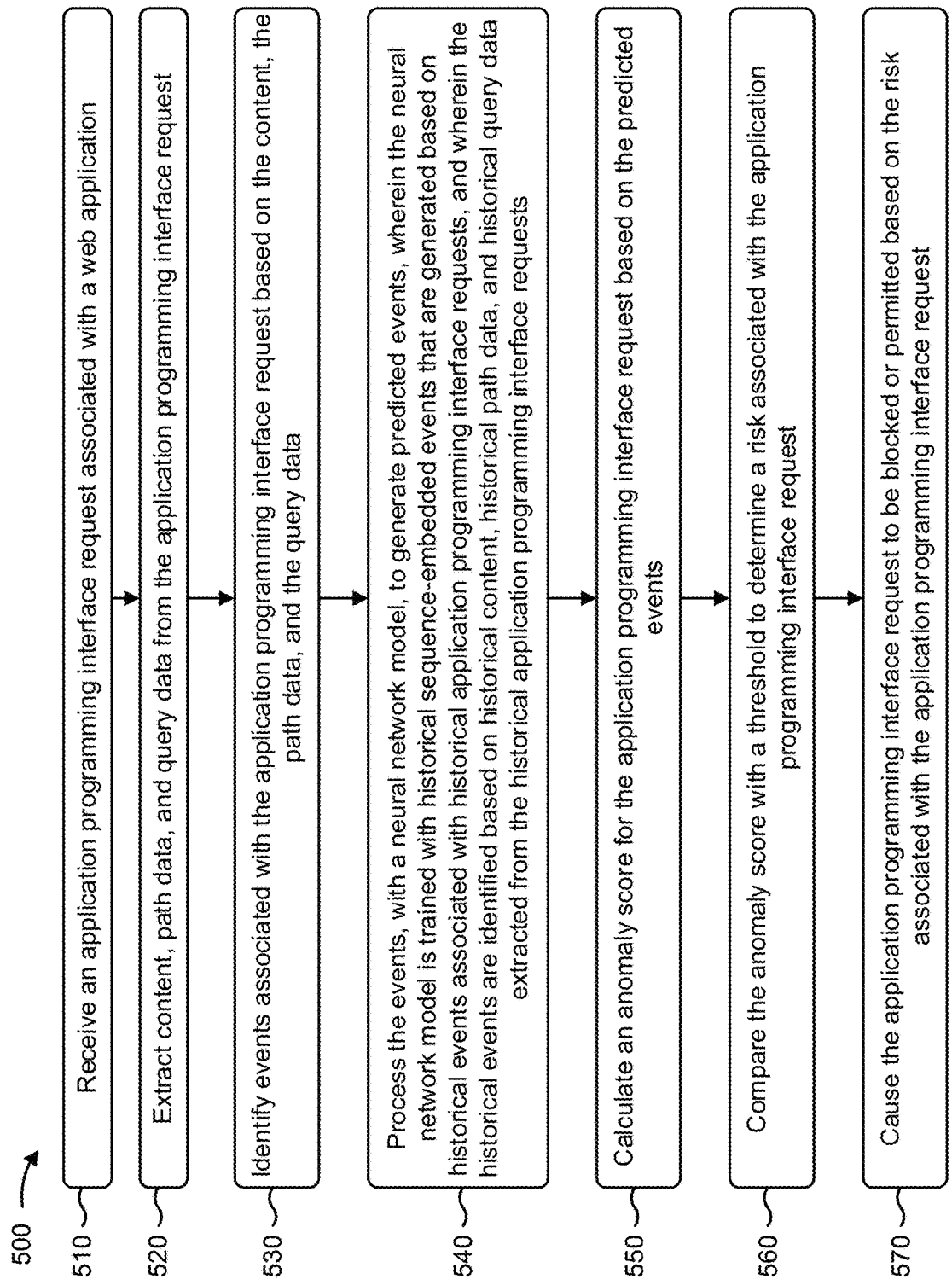

FIG. 5 is a flow chart of an example process 500 for utilizing a neural network model to determine risk associated with an application programming interface of a web application. In some implementations, one or more process blocks of FIG. 5 may be performed by a device (e.g., risk assessment platform 220). In some implementations, one or more process blocks of FIG. 5 may be performed by another device or a group of devices separate from or including the device, such as a client device (e.g., client device 210), a server device (e.g., server device 240), and/or the like.

As shown in FIG. 5, process 500 may include receiving an application programming interface request associated with a web application (block 510). For example, the device (e.g., using computing resource 224, processor 320, communication interface 370, and/or the like) may receive an application programming interface request associated with a web application, as described above.

As further shown in FIG. 5, process 500 may include extracting content, path data, and query data from the application programming interface request (block 520). For example, the device (e.g., using computing resource 224, processor 320, memory 330, and/or the like) may extract content, path data, and query data from the application programming interface request, as described above.

As further shown in FIG. 5, process 500 may include identifying events associated with the application programming interface request based on the content, the path data, and the query data (block 530). For example, the device (e.g., using computing resource 224, processor 320, storage component 340, and/or the like) may identify events associated with the application programming interface request based on the content, the path data, and the query data, as described above.

As further shown in FIG. 5, process 500 may include processing the events, with a neural network model, to generate predicted events, wherein the neural network model is trained with historical sequence-embedded events that are generated based on historical events associated with historical application programming interface requests, and wherein the historical events are identified based on historical content, historical path data, and historical query data extracted from the historical application programming interface requests (block 540). For example, the device (e.g., using computing resource 224, processor 320, memory 330, storage component 340, and/or the like) may process the events, with a neural network model, to generate predicted events, as described above. In some implementations, the neural network model may be trained with historical sequence-embedded events that are generated based on historical events associated with historical application programming interface requests. In some implementations, the historical events may be identified based on historical content, historical path data, and historical query data extracted from the historical application programming interface requests.

As further shown in FIG. 5, process 500 may include calculating an anomaly score for the application programming interface request based on the predicted events (block 550). For example, the device (e.g., using computing resource 224, processor 320, memory 330, and/or the like) may calculate an anomaly score for the application programming interface request based on the predicted events, as described above.

As further shown in FIG. 5, process 500 may include comparing the anomaly score with a threshold to determine a risk associated with the application programming interface request (block 560). For example, the device (e.g., using computing resource 224, processor 320, storage component 340, and/or the like) may compare the anomaly score with a threshold to determine a risk associated with the application programming interface request, as described above.

As further shown in FIG. 5, process 500 may include causing the application programming interface request to be blocked or permitted based on the risk associated with the application programming interface request (block 570). For example, the device (e.g., using computing resource 224, processor 320, memory 330, storage component 340, communication interface 370, and/or the like) may cause the application programming interface request to be blocked or permitted based on the risk associated with the application programming interface request, as described above.

Process 500 may include additional implementations, such as any single implementation or any combination of implementations described below and/or in connection with one or more other processes described elsewhere herein.

In a first implementation, identifying the events associated with the application programming interface request may include segmenting paths, identified in the path data, into elements; removing randomly generated or encoded elements from the elements to generate a set of elements; calculating a quantity of key-value pairs included in the query data; and combining the content, the set of elements, and the quantity of key-value pairs to generate the events.

In a second implementation, alone or in combination with the first implementation, process 500 may include determining whether an event, of the events, satisfies a predetermined threshold, and identifying the event as a rare event when the event satisfies the predetermined threshold.

In a third implementation, alone or in combination with one or more of the first and second implementations, calculating the anomaly score for the application programming interface request based on the predicted events may include determining probabilities associated with the predicted events; determining a probability associated with the application programming interface request; and calculating the anomaly score for the application programming interface request based on the probabilities associated with the predicted events and the probability associated with the application programming interface request.

In a fourth implementation, alone or in combination with one or more of the first through third implementations, the anomaly score may provide an indication of a confidence level associated with classifying the application programming interface request as an anomaly.

In a fifth implementation, alone or in combination with one or more of the first through fourth implementations, process 500 may include generating, based on the risk associated with the application programming interface request, an alert identifying a client device that generated the application programming interface request.

In a sixth implementation, alone or in combination with one or more of the first through fifth implementations, process 500 may include modifying a security policy to address the risk associated with the application programming interface request.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
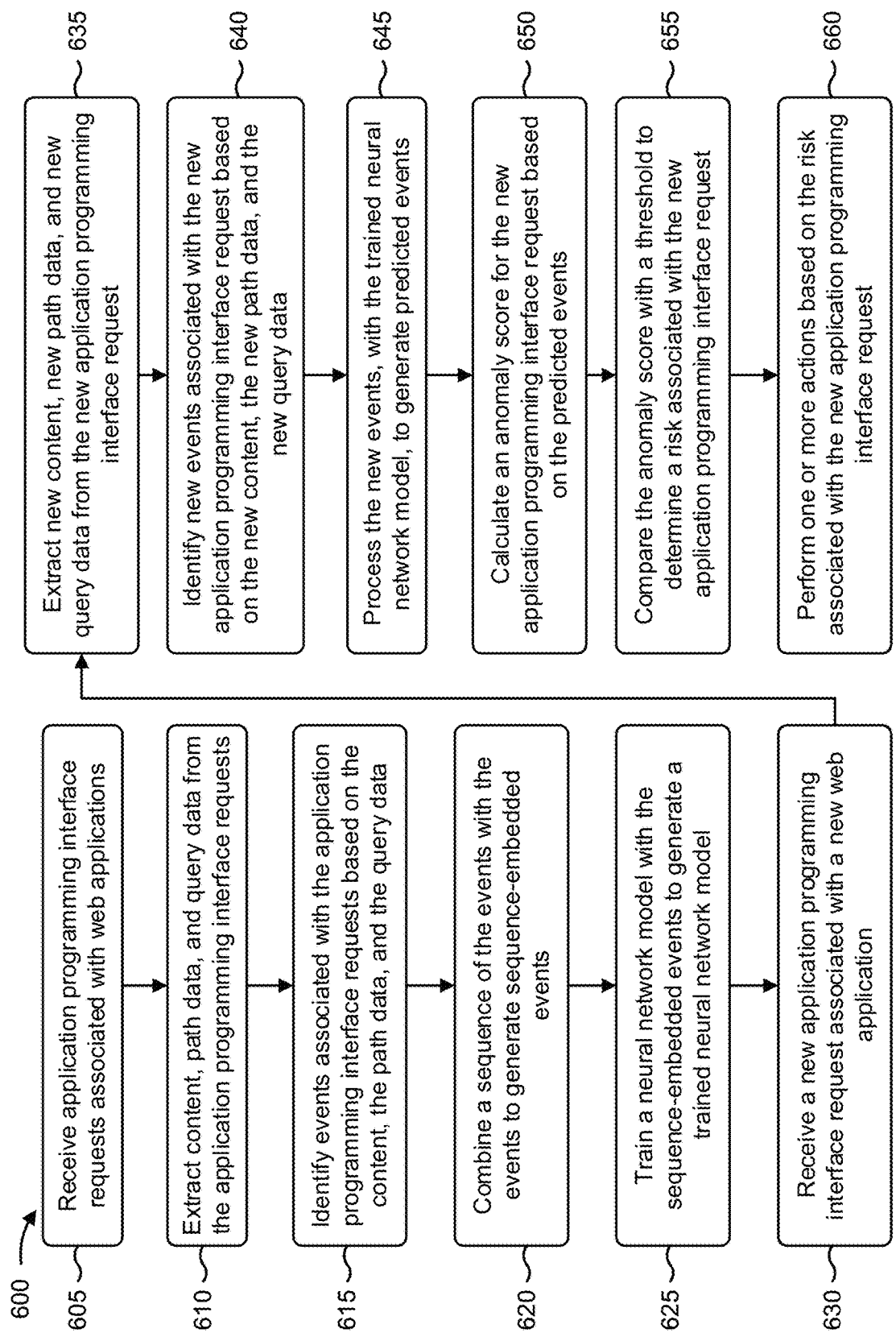

FIG. 6 is a flow chart of an example process 600 for utilizing a neural network model to determine risk associated with an application programming interface of a web application. In some implementations, one or more process blocks of FIG. 6 may be performed by a device (e.g., risk assessment platform 220). In some implementations, one or more process blocks of FIG. 6 may be performed by another device or a group of devices separate from or including the device, such as a client device (e.g., client device 210), a server device (e.g., server device 240), and/or the like.

As shown in FIG. 6, process 600 may include receiving application programming interface requests associated with web applications (block 605). For example, the device (e.g., using computing resource 224, processor 320, communication interface 370, and/or the like) may receive application programming interface requests associated with web applications, as described above.

As further shown in FIG. 6, process 600 may include extracting content, path data, and query data from the application programming interface requests (block 610). For example, the device (e.g., using computing resource 224, processor 320, memory 330, and/or the like) may extract content, path data, and query data from the application programming interface requests, as described above.

As further shown in FIG. 6, process 600 may include identifying events associated with the application programming interface requests based on the content, the path data, and the query data (block 615). For example, the device (e.g., using computing resource 224, processor 320, storage component 340, and/or the like) may identify events associated with the application programming interface requests based on the content, the path data, and the query data, as described above.

As further shown in FIG. 6, process 600 may include combining a sequence of the events with the events to generate sequence-embedded events (block 620). For example, the device (e.g., using computing resource 224, processor 320, memory 330, and/or the like) may combine a sequence of the events with the events to generate sequence-embedded events, as described above.

As further shown in FIG. 6, process 600 may include training a neural network model with the sequence-embedded events to generate a trained neural network model (block 625). For example, the device (e.g., using computing resource 224, processor 320, memory 330, storage component 340, and/or the like) may train a neural network model with the sequence-embedded events to generate a trained neural network model, as described above.

As further shown in FIG. 6, process 600 may include receiving a new application programming interface request associated with a new web application (block 630). For example, the device (e.g., using computing resource 224, processor 320, communication interface 370, and/or the like) may receive a new application programming interface request associated with a new web application, as described above.

As further shown in FIG. 6, process 600 may include extracting new content, new path data, and new query data from the new application programming interface request (block 635). For example, the device (e.g., using computing resource 224, processor 320, storage component 340, and/or the like) may extract new content, new path data, and new query data from the new application programming interface request, as described above.

As further shown in FIG. 6, process 600 may include identifying new events associated with the new application programming interface request based on the new content, the new path data, and the new query data (block 640). For example, the device (e.g., using computing resource 224, processor 320, memory 330, and/or the like) may identify new events associated with the new application programming interface request based on the new content, the new path data, and the new query data, as described above.

As further shown in FIG. 6, process 600 may include processing the new events, with the trained neural network model, to generate predicted events (block 645). For example, the device (e.g., using computing resource 224, processor 320, storage component 340, and/or the like) may process the new events, with the trained neural network model, to generate predicted events, as described above.

As further shown in FIG. 6, process 600 may include calculating an anomaly score for the new application programming interface request based on the predicted events (block 650). For example, the device (e.g., using computing resource 224, processor 320, memory 330, and/or the like) may calculate an anomaly score for the new application programming interface request based on the predicted events, as described above.

As further shown in FIG. 6, process 600 may include comparing the anomaly score with a threshold to determine a risk associated with the new application programming interface request (block 655). For example, the device (e.g., using computing resource 224, processor 320, storage component 340, and/or the like) may compare the anomaly score with a threshold to determine a risk associated with the new application programming interface request, as described above.

As further shown in FIG. 6, process 600 may include performing one or more actions based on the risk associated with the new application programming interface request (block 660). For example, the device (e.g., using computing resource 224, processor 320, memory 330, storage component 340, communication interface 370, and/or the like) may perform one or more actions based on the risk associated with the new application programming interface request, as described above.

Process 600 may include additional implementations, such as any single implementation or any combination of implementations described below and/or in connection with one or more other processes described elsewhere herein.

In a first implementation, performing the one or more actions may include causing the new application programming interface request to be blocked based on the risk associated with the new application programming interface request, or permitting the new application programming interface request based on the risk associated with the new application programming interface request.

In a second implementation, alone or in combination with the first implementation, performing the one or more actions may include generating, based on the risk associated with the new application programming interface request, an alert identifying a client device that generated the new application programming interface request; modifying a security policy to address the risk associated with the new application programming interface request; generating a security policy to address the risk associated with the new application programming interface request; or quarantining, based on the risk associated with the new application programming interface request, the new application programming interface request for further evaluation.

In a third implementation, alone or in combination with one or more of the first and second implementations, process 600 may include retraining the neural network model based on the risk associated with the new application programming interface request.

In a fourth implementation, alone or in combination with one or more of the first through third implementations, identifying the events associated with the application programming interface requests may include segmenting paths, identified in the path data, into elements; removing randomly generated or encoded elements from the elements to generate a set of elements; calculating a quantity of key-value pairs included in the query data; and combining the content, the set of elements, and the quantity of key-value pairs to generate the events.

In a fifth implementation, alone or in combination with one or more of the first through fourth implementations, process 600 may include determining whether an event, of the events, satisfies a predetermined threshold, and identifying the event as a rare event when the event satisfies the predetermined threshold.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A method, comprising:
receiving, by a device, application programming interface requests associated with web applications;
extracting, by the device, content, path data, and query data from the application programming interface requests;

identifying, by the device, events associated with the application programming interface requests based on the content, the path data, and the query data;
combining, by the device, a sequence of the events with the events to generate sequence-embedded events, wherein the sequence-embedded events represent an order of each event in a sequence of the application programming interface requests;
training, by the device, a neural network model with the sequence-embedded events to generate a trained neural network model;
receiving, by the device, a new application programming interface request associated with a new web application;
extracting, by the device, new content, new path data, and new query data from the new application programming interface request;
identifying, by the device, new events associated with the new application programming interface request based on the new content, the new path data, and the new query data;
processing, by the device, the new events, with the trained neural network model, to generate predicted events, wherein the predicted events include at least one of:
an event indicating a method predicted to be executed by the new application programming interface request,
an event indicating a uniform resource identifier of a resource predicted to be accessed by the new application programming interface request, or
an event indicating a uniform resource identifier query predicted to be executed by the new application programming interface request;
calculating, by the device, an anomaly score for the new application programming interface request based on the predicted events;
comparing, by the device, the anomaly score with a threshold to determine a risk associated with the new application programming interface request; and
causing, by the device, the new application programming interface request to be blocked or permitted based on the risk associated with the new application programming interface request.

2. The method of claim 1, further comprising:
pretraining, prior to training the neural network model, the neural network model to predict arbitrary events in the sequence of the events.

3. The method of claim 2, wherein pretraining the neural network model comprises:
randomly masking a portion of the events in the sequence of the events; and
utilizing the neural network model to attempt to predict the portion of the events that are randomly masked.

4. The method of claim 1, further comprising:
generating a security policy to address the risk associated with the new application programming interface request.

5. The method of claim 1, further comprising:
quarantining, based on the risk associated with the new application programming interface request, the new application programming interface request for further evaluation.

6. The method of claim 1, further comprising:
retraining the neural network model based on the risk associated with the new application programming interface request.

7. The method of claim 1, wherein the neural network model includes one or more of:
a recurrent neural network (RNN) model,
a long short-term memory (LSTM) model,
a self-attention neural network model, or
a combination of one or more of the RNN model, the LSTM model, or the self-attention neural network model.

8. A device, comprising:
one or more memories; and
one or more processors, communicatively coupled to the one or more memories, configured to:
receive an application programming interface request associated with a web application;
extract content, path data, and query data from the application programming interface request;
identify events associated with the application programming interface request based on the content, the path data, and the query data;
process the events, with a neural network model, to generate predicted events,
wherein the predicted events include at least one of:
an event indicating a method predicted to be executed by a new application programming interface request,
an event indicating a uniform resource identifier of a resource predicted to be accessed by the application programming interface request, or
an event indicating a uniform resource identifier query predicted to be executed by the application programming interface request,
wherein the neural network model is trained with historical sequence-embedded events that are generated based on historical events associated with historical application programming interface requests,
wherein the historical sequence-embedded events represent an order of each historical event in a sequence of the application programming interface requests, and
wherein the historical events are identified based on historical content, historical path data, and historical query data extracted from the historical application programming interface requests;
calculate an anomaly score for the application programming interface request based on the predicted events;
compare the anomaly score with a threshold to determine a risk associated with the application programming interface request; and
cause the application programming interface request to be blocked or permitted based on the risk associated with the application programming interface request.

9. The device of claim 8, wherein the one or more processors, when identifying the events associated with the application programming interface request, are configured to:
segment paths, identified in the path data, into elements;
remove randomly generated or encoded elements from the elements to generate a set of elements;
calculate a quantity of key-value pairs included in the query data; and
combine the content, the set of elements, and the quantity of key-value pairs to generate the events.

10. The device of claim 8, wherein the one or more processors are further configured to:
determine whether a particular event, of the events, satisfies a predetermined threshold; and identify the particular event as a rare event when the particular event satisfies the predetermined threshold.

11. The device of claim 8, wherein the one or more processors, when calculating the anomaly score for the application programming interface request based on the predicted events, are configured to:
determine probabilities associated with the predicted events;
determine a probability associated with the application programming interface request; and
calculate the anomaly score for the application programming interface request based on the probabilities associated with the predicted events and the probability associated with the application programming interface request.

12. The device of claim 8, wherein the anomaly score provides an indication of a confidence level associated with classifying the application programming interface request as an anomaly.

13. The device of claim 8, wherein the one or more processors are further configured to:
generate, based on the risk associated with the application programming interface request, an alert identifying a client device that generated the application programming interface request.

14. The device of claim 8, wherein the one or more processors are further configured to:
modify a security policy to address the risk associated with the application programming interface request.

15. A non-transitory computer-readable medium storing instructions, the instructions comprising:
one or more instructions that, when executed by one or more processors, cause the one or more processors to:
receive application programming interface requests associated with web applications;
extract content, path data, and query data from the application programming interface requests;
identify events associated with the application programming interface requests based on the content, the path data, and the query data;
combine a sequence of the events with the events to generate sequence-embedded events,
wherein the sequence-embedded events represent an order of each event in a sequence of the application programming interface requests;
train a neural network model with the sequence-embedded events to generate a trained neural network model;
receive a new application programming interface request associated with a new web application;
extract new content, new path data, and new query data from the new application programming interface request;
identify new events associated with the new application programming interface request based on the new content, the new path data, and the new query data;
process the new events, with the trained neural network model, to generate predicted events,
wherein the predicted events include at least one of:
an event indicating a method predicted to be executed by the new application programming interface request,
an event indicating a uniform resource identifier of a resource predicted to be accessed by the new application programming interface request, or
an event indicating a uniform resource identifier query predicted to be executed by the new application programming interface request;
calculate an anomaly score for the new application programming interface request based on the predicted events;
compare the anomaly score with a threshold to determine a risk associated with the new application programming interface request; and
perform one or more actions based on the risk associated with the new application programming interface request.

16. The non-transitory computer-readable medium of claim 15, wherein the one or more instructions, that cause the one or more processors to perform the one or more actions, cause the one or more processors to perform one of:
cause the new application programming interface request to be blocked based on the risk associated with the new application programming interface request, or
permit the new application programming interface request based on the risk associated with the new application programming interface request.

17. The non-transitory computer-readable medium of claim 15, wherein the one or more instructions, that cause the one or more processors to perform the one or more actions, cause the one or more processors to perform one or more of:
generate, based on the risk associated with the new application programming interface request, an alert identifying a client device that generated the new application programming interface request;
modify a security policy to address the risk associated with the new application programming interface request;
generate a security policy to address the risk associated with the new application programming interface request; or
quarantine, based on the risk associated with the new application programming interface request, the new application programming interface request for further evaluation.

18. The non-transitory computer-readable medium of claim 15, wherein the instructions further comprise:
one or more instructions that, when executed by the one or more processors, cause the one or more processors to:
retrain the neural network model based on the risk associated with the new application programming interface request.

19. The non-transitory computer-readable medium of claim 15, wherein the one or more instructions, that cause the one or more processors to identify the events associated with the application programming interface requests, cause the one or more processors to:
segment paths, identified in the path data, into elements;
remove randomly generated or encoded elements from the elements to generate a set of elements;
calculate a quantity of key-value pairs included in the query data; and
combine the content, the set of elements, and the quantity of key-value pairs to generate the events.

20. The non-transitory computer-readable medium of claim 15, wherein the instructions further comprise:
one or more instructions that, when executed by the one or more processors, cause the one or more processors to:

determine whether a particular event, of the events, satisfies a predetermined threshold; and identify the particular event as a rare event when the particular event satisfies the predetermined threshold.

* * * * *